US009811670B2

(12) United States Patent
Kuno et al.

(10) Patent No.: US 9,811,670 B2
(45) Date of Patent: *Nov. 7, 2017

(54) INFORMATION PROCESSING DEVICE, INFORMATION PROCESSING METHOD, AND PROGRAM

(71) Applicant: Sony Corporation, Tokyo (JP)

(72) Inventors: Hiroshi Kuno, Kanagawa (JP); Kenjiro Ueda, Kanagawa (JP); Munetake Ebihara, Kanagawa (JP); Takamichi Hayashi, Tokyo (JP); Koji Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,912

(22) Filed: Oct. 24, 2014

(65) Prior Publication Data
US 2015/0046719 A1   Feb. 12, 2015

Related U.S. Application Data

(62) Division of application No. 13/207,567, filed on Aug. 11, 2011, now Pat. No. 8,938,073.

(30) Foreign Application Priority Data

Aug. 23, 2010 (JP) .............................. P2010-185833

(51) Int. Cl.
*H04L 29/06* (2006.01)
*G06F 21/60* (2013.01)
(Continued)

(52) U.S. Cl.
CPC ........ *G06F 21/602* (2013.01); *G11B 20/0021* (2013.01); *G11B 20/00086* (2013.01);
(Continued)

(58) Field of Classification Search
CPC .............................. H04L 9/3263; H04L 9/083
See application file for complete search history.

(56) References Cited

U.S. PATENT DOCUMENTS 6,002,772 A    12/1999  Saito
6,823,454 B1 * 11/2004  Hind ................. H04L 29/12066
                                                      713/168

(Continued)

FOREIGN PATENT DOCUMENTS

JP         2008-098765 A       4/2008

OTHER PUBLICATIONS

"Content Proteccion for Recordable Media Specification—SD Memory Card Book Common Part", CPRM Specification, 4C Entity, LLC, No. Revision 0.961, May 3, 2007 (May 3, 2007), pp. I-5, 1-26 XP002495304, Retrieved from the Internet : URL: http://www.4centity.com.

(Continued)

*Primary Examiner* — Shawnchoy Rahman
(74) *Attorney, Agent, or Firm* — Chip Law Group

(57) ABSTRACT

An information processing device including: a data processing unit that generates an encryption key of content; and a communication unit that transmits an encryption key generated by the data processing unit, wherein the data processing unit generates, as the encryption key, individual keys that are different for each new content recording processing on a recording medium in a content recording device, and transmits the individual keys through the communication unit.

8 Claims, 19 Drawing Sheets

(51) Int. Cl.
*G11B 20/00* (2006.01)
*H04L 9/08* (2006.01)
*H04L 9/32* (2006.01)

(52) U.S. Cl.
CPC .. *G11B 20/00224* (2013.01); *G11B 20/00253* (2013.01); *G11B 20/00347* (2013.01); *G11B 20/00478* (2013.01); *G11B 20/00507* (2013.01); *G11B 20/00521* (2013.01); *G11B 20/00695* (2013.01); *G11B 20/00847* (2013.01); *G11B 20/00855* (2013.01); *G11B 20/00869* (2013.01); *H04L 9/083* (2013.01); *H04L 9/0822* (2013.01); *H04L 9/0869* (2013.01); *H04L 9/3263* (2013.01); *G11B 2220/17* (2013.01); *G11B 2220/61* (2013.01); *H04L 2209/60* (2013.01)

(56) References Cited

U.S. PATENT DOCUMENTS

| | | | | |
|---|---|---|---|---|
| 6,901,385 | B2* | 5/2005 | Okamoto | G06F 21/10 705/50 |
| 7,320,069 | B1* | 1/2008 | Sundharraj | G06F 21/10 348/E7.056 |
| 8,359,273 | B2 | 1/2013 | Leleu | |
| 8,393,005 | B2* | 3/2013 | Ochi | G06F 21/10 713/169 |
| 2002/0157002 | A1 | 10/2002 | Messerges et al. | |
| 2003/0009667 | A1* | 1/2003 | Horiuchi | H04M 1/72525 713/168 |
| 2003/0023622 | A1 | 1/2003 | Obermeyer et al. | |
| 2005/0232415 | A1* | 10/2005 | Little | G06F 21/72 380/28 |
| 2006/0010074 | A1 | 1/2006 | Zeitsiff et al. | |
| 2006/0153380 | A1* | 7/2006 | Gertner | G06F 21/602 380/221 |
| 2006/0224513 | A1* | 10/2006 | Kawamoto | G06F 21/10 705/50 |
| 2007/0113079 | A1* | 5/2007 | Ito | G06F 9/468 713/166 |
| 2007/0150963 | A1 | 6/2007 | Lee et al. | |
| 2007/0156603 | A1 | 7/2007 | Yoon et al. | |
| 2008/0199007 | A1* | 8/2008 | Candelore | H04L 9/083 380/201 |
| 2009/0006796 | A1* | 1/2009 | Chang | G06F 21/805 711/163 |
| 2009/0067622 | A1* | 3/2009 | Yao | H04L 9/083 380/44 |
| 2009/0086602 | A1* | 4/2009 | Ushiyama | G11B 7/005 369/94 |
| 2009/0271411 | A1 | 10/2009 | Takashima et al. | |
| 2010/0202606 | A1 | 8/2010 | Almeida | |
| 2011/0213856 | A1 | 9/2011 | Moroney | |
| 2013/0073466 | A1 | 3/2013 | Farrugia et al. | |
| 2013/0132232 | A1 | 5/2013 | Pestoni et al. | |
| 2014/0075195 | A1* | 3/2014 | Kobayashi | G06F 21/10 713/171 |

OTHER PUBLICATIONS

"Content Proteccion for Recordable Media Specification—Network Download Book", CPRM Specification, 4C Entity, LLC, No. Revision 0.90, Aug. 5, 2004 (Aug. 5, 2004), page Complete, XP002379489.

Partial European Search Report EP 11174966, dated Feb. 22, 2012.

* cited by examiner

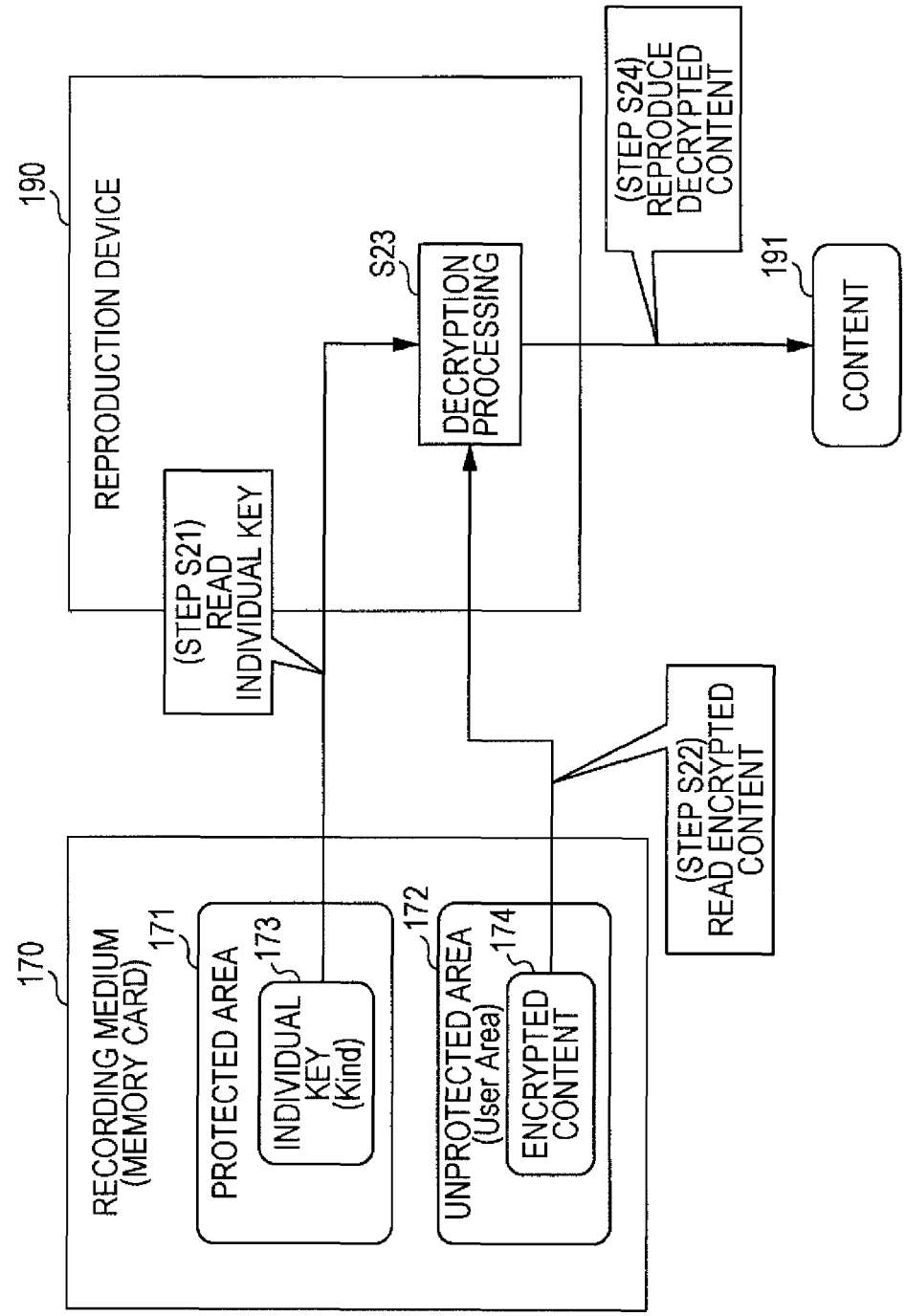

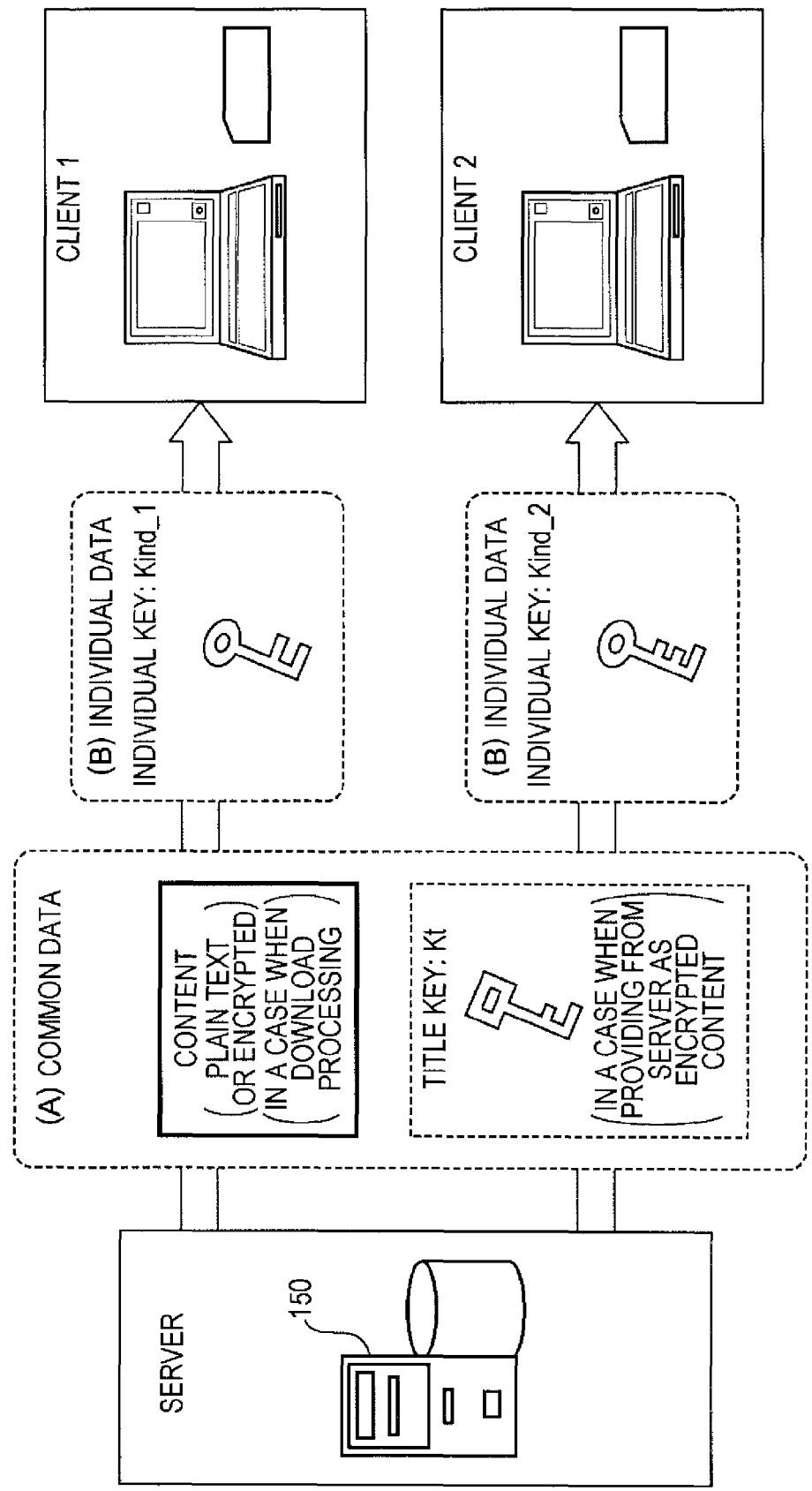

FIG. 12

| TRANSMISSION PROCESSING UNIQUE ID | TRANSMISSION CONTENT INFORMATION | INDIVIDUAL KEY (Kind) INFORMATION | TRANSMISSION DESTINATION INFORMATION | TRANSMITTING USER | TRANSMISSION TIME AND DATE INFORMATION | TITLE KEY (Kt) INFORMATION |
|---|---|---|---|---|---|---|
| 5784102578 | ABC STORY | 2317cad···31 | xyz@patnet.co.jp | SUZUKIICHIRO | 07.22.2010 | 154366···a21 |
| 2354711245 | ABC STORY | 012ea765···22 | jkl@ynos.ne.jp | TANAKAKAORU | 09.15.2010 | 154366···a21 |
| ···· | ···· | ···· | ···· | ···· | ···· | ···· |

(RECORDING DEVICE AND RECORDING MEDIUM MAY BE INDIVIDUALLY REGISTERED) ↔ TRANSMISSION DESTINATION INFORMATION (IN A CASE WHEN PROVIDING FROM SERVER AS ENCRYPTED CONTENT USING TITLE KEY) ↔ TITLE KEY (Kt) INFORMATION

INFORMATION PROCESSING DEVICE, INFORMATION PROCESSING METHOD, AND PROGRAM

CROSS-REFERENCE TO RELATED APPLICATION

The present application is a divisional application of U.S. Ser. No. 13/207,567 filed Aug. 11, 2011 which claims priority from Japanese Patent Application No. JP 2010-185833 filed in the Japanese Patent Office on Aug. 23, 2010, the entire contents of which is incorporated herein by reference.

BACKGROUND

The present disclosure relates to an information processing device, an information processing method, and a program. In particular, the disclosure relates to an information processing device that realizes a configuration for the prevention of illegitimate use of content, an information processing method, and a program.

Recently, a variety of media such as DVDs (Digital Versatile Disc), Blu-ray Discs (registered trademark), and flash memories has been used as information recording media. In particular, recently, the use of memory cards such as USB memories with a mass storage flash memory built therein has been popularized. By recording content, such as music and movies on such a variety of information recording media and equipping the media on a reproduction device (player), a user is able to perform reproduction of the content.

In addition, in recent years, the circulation of content via networks has become popularized, and the form of the content purchasing process by a user is gradually shifting from the purchasing process of discs on which content is recorded in advance to the process of downloading from a server that is network connected.

As specific content purchasing forms, as well as the process of performing purchase of media such as ROM discs, for example, there are the below content purchasing forms:

(a) EST (Electric Sell Through) of connecting to a content providing server using a user device such as a network connectable terminal, a PC, or the like, and purchasing the content by downloading; and (b) MoD (Manufacturing on Demand) of recording content on a medium (memory card or the like) of a user using a shared terminal set up in a public space such as a convenience store or a train station.

In so doing, by owning media such as a content recording memory card, a user is able to selectively purchase and record on their own media a variety of content freely from a variety of content sources such as content providers.

Here, the processing of EST, MoD, and the like is described in Japanese Unexamined Patent Application Publication No. 2008-98765.

However, with many forms of content such as music data, image data, and the like, the copyright, distribution rights, and the like are held by the creator or the seller. Therefore, in a case when content is provided to users, typically, the use of content is approved only for users with certain use restrictions, that is, who have a legitimate right of use, and a control is performed such that illegitimate use such as copying without permission is not carried out.

Specifically, in a case when a user downloads content such as a movie from a server and records it on a recording medium such as a memory card of the user, for example, the processing below is performed.

The server provides the content as encrypted content to the client (user device).

Further, the server provides a key for decrypting the encrypted content to only a user who has performed a legitimate content purchasing process.

By performing such content provision processing, realizing use control of content is attempted.

However, even by performing the processing described above, for example, it is difficult to prevent the user who performed a legitimate content purchasing process from providing the key for decrypting the content obtained from the server to other people. Specifically, it may be supposed that the key obtained from the server is, by being disclosed online, set to be usable by an unspecified number of users. When such acts are committed, it becomes possible for anyone to decrypt, reproduce, and use encrypted content using the leaked key, and a situation occurs in which illegitimate use of content is rampant.

SUMMARY

It is desirable to provide an information processing device that realizes a configuration of effectively preventing illegitimate use of content by leaking of keys used in the decrypting of encrypted content, an information processing method, and a program.

According to an embodiment of the disclosure, there is provided an information processing device including: a data processing unit that generates an encryption key of content; and a communication unit that transmits the encryption key generated by the data processing unit, wherein the data processing unit generates, as the encryption key, individual keys that are different for each new content recording processing on a recording medium in a content recording device, and transmits the individual keys through the communication unit.

In the information processing device according to the embodiment of the disclosure, the recording medium may have a protected area with access restrictions, and the data processing unit may present a certificate that has access permission information recorded therein to the recording medium, and providing that recording information verification processing of a certificate of the recording medium is carried out, may execute writing of the individual keys to a protected area.

In the information processing device according to the embodiment of the disclosure, the data processing unit may transmit content on which encryption processing is to be performed by the individual keys to the content recording device.

In the information processing device according to the embodiment of the disclosure, the data processing unit may transmit, when the content recording device executes processing to copy content from an information recording medium an which content is already recorded on the recording medium, the individual keys as the keys for encryption processing content that is the target for copying.

In the information processing device according to the embodiment of the disclosure, the data processing unit may generate the individual keys by random number generation processing.

In the information processing device according to the embodiment of the disclosure, the data processing unit may perform processing to store the individual keys in a memory unit by generating management information that is made to correspond with the content recording device or the recording medium.

According to another embodiment of the disclosure, there is provided an information processing device including a data processing unit that executes content recording processing on a recording medium, wherein the data processing unit has a configuration executing recording processing on the recording medium by reading individual keys recorded in a protected area that is an access restricted area set by the recording medium, and executing encryption processing, applying the individual keys, of content received from a server or content read from the information recording medium, and when carrying out reading processing of the individual keys, reading from a protected area of the individual keys is executed by presenting a certificate that has access permission information recorded therein to the recording medium, providing that recording information verification processing of a certificate of the recording medium is carried out.

According to still another embodiment of the disclosure, there is provided an information processing device including a data processing unit that executes decryption processing on encrypted content recorded on a recording medium, wherein the data processing unit has a configuration reading individual keys recorded in a protected area that is an access restricted area set by the recording medium, and executing decryption processing of the encrypted content applying the individual keys, and when carrying out reading processing of the individual keys, reading from a protected area of the individual keys is executed by presenting a certificate that has access permission information recorded therein to the recording medium, providing that recording information verification processing of a certificate of the recording medium is carried out.

According to still another embodiment of the disclosure, there is provided a content management system including: a recording medium; a recording device that executes content recording processing on the recording medium; and a server that provides an encryption key of the content, wherein the server generates individual keys that are different for each new content recording processing on a recording medium in the content recording device and records the individual keys on a protected area of the recording medium with restricted access, the recording device has a configuration executing recording processing on the recording medium by reading individual keys recorded on the protected area, and executing encryption processing, applying the individual keys, of content received from a server or content read from the information recording medium, and the recording medium verifies recorded information of a certificate on which access permission information for each device is recorded according to an access request to the protected area from the server and the recording device, and performs processing of permitting access in a case when it is verified that there is access authority.

According to still another embodiment of the disclosure, there is provided an information processing method that is executed on a server, including: data processing of generating an encryption key of content by a data processing unity and communicating of transmitting an encryption key generated by the data processing unit, by a communication unit, wherein the data processing generates, as the encryption key, individual keys that are different for each new content recording processing on a recording medium in a content recording device, and transmits the individual keys through the communication unit.

According to still another embodiment of the disclosure, there is provided an information processing method that is executed in an information processing device, including data processing of executing content recording processing on a recording medium, by a data processing unit, wherein the data processing includes recording processing on the recording medium by reading individual keys recorded on a protected area that is an access restricted area set by the recording medium, and executing encryption processing, applying the individual keys, of content received from a server or content read from an information recording medium, wherein, when carrying out reading processing of the individual keys, reading from a protected area of the individual keys is executed by presenting a certificate that has access permission information recorded therein to the recording medium, providing that recording information verification processing of a certificate of the recording medium is carried out.

According to still another embodiment of the disclosure, there is provided an information processing method that is an information processing method executed in an information reproduction device, including data processing of executing decryption processing of encrypted content recorded on a recording medium, by a data processing unit, wherein the data processing includes reading of individual keys recorded in a protected area that is an access restricted area set by the recording medium, and executing decryption processing of the encrypted content applying the individual keys, wherein, when carrying out reading processing of the individual keys, reading from a protected area of the individual keys is executed by presenting a certificate that has access permission information recorded therein to the recording medium, providing that recording information verification processing of a certificate of the recording medium is carried out.

According to still another embodiment of the disclosure, there is provided a program that executes information processing on a server, including data processing of generating an encryption key of content, by a data processing unit, and communicating of transmitting an encryption key generated by the data processing unit, by a communication unit, wherein in the data processing, individual keys that are different for each new content recording processing on a recording medium in a content recording device are generated as the encryption key, and are transmitted through the communication unit.

According to still another embodiment of the disclosure, there is provided a program that executes information processing in an information recording device, including data processing of executing content recording processing on a recording medium by a data processing unit, wherein the data processing includes recording processing on the recording medium by reading individual keys recorded in a protected area that is an access restricted area set by the recording medium, and executing encryption processing, applying the individual keys, of content received from a server or content read from the information recording medium, wherein, when carrying out reading processing of the individual keys, reading from a protected area of the individual keys is executed by presenting a certificate that has access permission information recorded therein to the recording medium, providing that recording information verification processing of a certificate of the recording medium is carried out.

According to still another embodiment of the disclosure, there is provided a program that executes information processing in an information reproduction device, including data processing of executing decryption processing of encrypted content recorded on a recording medium, by a data processing unit, wherein the data processing includes reading of individual keys recorded in a protected area that is an access restricted area set by the recording medium, and executes decryption processing of the encrypted content applying the individual keys, wherein, when carrying out reading processing of the individual keys, reading from a protected area of the individual keys is executed by presenting a certificate that has access permission information recorded therein to the recording medium, providing that recording information verification processing of a certificate of the recording medium is carried out.

Here, a program according to the embodiment of the disclosure is, for example, a program that is able to be provided by a memory medium or a communication medium that is able to provide the program in a computer readable format to an information processing device or a computer system that is able to execute a variety of program codes. By providing such a program in a computer readable format, processing that is suited for the program is realized on the information processing device or the computer system.

Further objects, characteristics, and advantages of the embodiments of the disclosure will be made clear in the following examples of embodiments of the disclosure and the more detailed descriptions based on the attached drawings. Here, in the present specifications, a system is a logically collected, configuration of a plurality of devices, and this devices of the respective configurations are not limited to be within the same housing.

According to the configuration of the embodiments of the disclosure, a configuration in which the illegitimate use of content based on leaking of the encryption key of the content is prevented is realized. Specifically, when the recording device records downloaded content from a server and copied content from a disc on a recording medium such as a memory card, encryption is performed and recorded applying individual keys, as encryption keys for the recorded content, that are different by units of recording processing on a medium. The server writes in the individual keys to a protective area that is an access limited area of the recording medium, and the recording device executes encryption processing by reading the individual keys written in the protective area of the recording medium. The individual keys are generated by a server, and the individual key data is managed along with the device information that has executed content recording processing and the like as management information, and in a case when an individual key is leaked, it becomes possible to investigate the source of the leak of the individual key based on the management information.

BRIEF DESCRIPTION OF THE DRAWINGS

FIG. 10 is a diagram describing an encryption processing example of content on which individual keys are applied in a recording device according to still another example of the disclosure;
FIG. 11 is a sequence diagram describing the configuration of provision data from a server according to one example of the disclosure;
FIG. 12 is a diagram describing a data example recorded in management information of a server.

DETAILED DESCRIPTION OF EMBODIMENTS

An information processing device, an information processing method, and a program according to the embodiments of the disclosure will be described below in more detail with reference to the drawings. Here, description will be made according to the items below.
1. Outline of Content Provision Processing and Use Processing
2. Basic Configuration Example of Content and Data Provided to User of Related Art
3. Configuration Example of Memory Card as Content Recording Medium
4. Recording Reproduction Processing Example of Data and Content Provided to User According to Embodiment of Disclosure
5. Processing Sequence of Processing Executed in Server and Client
  (5-1) Data Processing Sequence in Server
  (5-2) Content Recording Sequence in Recording Device and Recording Medium
  (5-3) Content Reproduction Sequence in Reproduction Device 6. Content Provision Processing Sequence when Title Key is Used and When Title Key is Not Used
  (6-1) Processing Example When Title Key is Not Used
  (6-2) Processing Example When Title Key is Used
7. Hardware Configuration Example of Each Device 1. Outline of Content Provision Processing and Use Processing An information processing device, an information processing method, and a program according to the embodiments of the disclosure will be described below with reference to the drawings.

First, the outline of content provision processing and use processing will be described with reference to FIG. 1.

Figure 1:
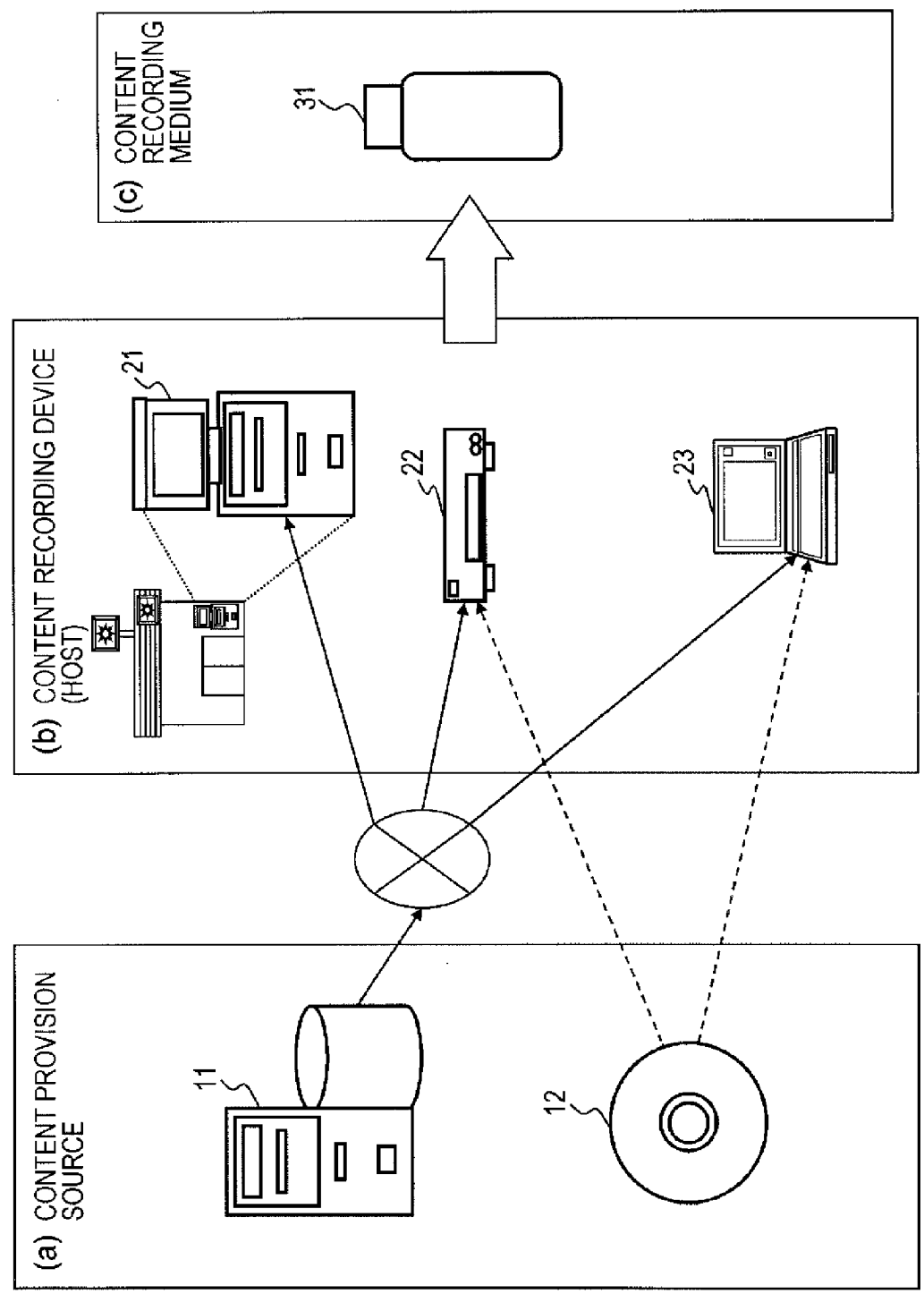
FIG. 1 is a diagram describing the outline of content provision processing and use processing.

The following are illustrated in FIG. 1 from the left.
  (a) Content provision source
  (b) Content recording device (host)
  (c) Content recording medium A (c) Content recording medium is a medium on which a user records content and which is used for reproduction processing of the content. In FIG. 1, a memory card 31 including a recording unit composed off for example, a flash memory or the like is illustrated.

The user records and uses a variety of content such as, for example, music and movies on the memory card 31. Such content is, for example, copyright managed content or the like, and content that is a subject of use control. Use is only permitted under predetermined use conditions, and, essentially, illegitimate copy processing, unrestricted distribution of copied data, and the like are banned. Here, in a case when content is recorded on the memory card 31, use control information (usage rules) regulating copy restriction information that is the number of times that such recorded content is permitted to be copied, restriction information of output to other apparatuses, and the like, is often collectively recorded.

The (a) content provision source illustrated in FIG. 1 is the provision source of use restricted content such as music and movies. A content server 11 and a content recording disc 12, such as a ROM disc on which content is recorded in advance, are illustrated in FIG. 1.

The content server 11 is a server that provides content, such as music and movies. The content recording disc 12 is a disc such as a ROM disc on which content, such as music and movies, is recorded in advance.

The user is able to receive (download) and record content on the memory card 31 by equipping for example, the memory card 31 that is a (c) content recording medium illustrated in FIG. 1 on a (b) content recording device (host) and connecting to the content server 11 via the (b) content recording device (host).

Here, the content server 11 performs processing according to a predetermined sequence when download processing, and provides information for content reproduction such as, as well as encrypted content, key information that is applied to the decryption of the encrypted data to the client. Further, there may be a case when content related information such as use control information of the content and a token on which content management information other than the content ID is recorded is provided.

Other than download processing from the content server 11, the user is able to copy content from the (a) content recording disc 12 illustrated in FIG. 1 and record on the memory card 31 that is a (c) content recording medium.

For example, the user performs copying of recorded content on the content recording disc 12 to the memory card 31 by equipping the content recording disc 12 such as a ROM disc on which content is recorded in advance on a (b) content recording device (host) equipped with a memory card 31. However, if the copy processing is executed illegitimately, the copied content is unlimitedly multiplied. In order to avoid such a situation, for example, when content copy processing from a medium on which encrypted content according to an AACS (Advanced Access Content System) standard is recorded, processing connected to the content server 11 and following a predetermined sequence is performed. Such copy processing is known as managed copying (MC). Here, the AACS regulates a variety of standards for copyright protection of the content.

In a case when content copying is performed according to managed copying (MC), content is recorded on a medium to be copied on by connecting a recording reproduction device 22 and a PC 23 of the (b) content recording device (host) illustrated in FIG. 1 to the content server 11 and receiving content management information such as use control information or a token corresponding to the copied content and, further, key information that is applied to the decryption of encrypted content, from the content server 11.

In so doing, the user is able to record and use the content on a (c) content recording medium owned by the user such as the memory card 31 illustrated in FIG. 1 by either form of download processing content from a server or content copy processing from a disc on which the content is recorded.

Here, as a device that records content on a medium of the user, as illustrated by the (b) content recording device (host) in FIG. 1, there is a variety of apparatuses usable by an unspecified number of users such as a shared terminal 21 set up in a public space such as a convenience store or a train station, and a recording reproducer (CE (Consumer Electronics) apparatus) 22 and the PC 23 that are user apparatuses.

Such apparatuses are all devices that are able to equip the memory card 31 that is a (c) content recording medium.

Further, such (b) content recording media (hosts) are provided with a communication unit that executes data transceiving processing via a network in a case when they have configurations executing download processing from the content server 11, and are devices capable of disc reproduction in a case when they have configurations using the content recording disc 12.

As illustrated in FIG. 1, the user records, via the (b) content recording device (host), downloaded content from the content server 11 that is the (a) content provision source or content recorded on the content recording disc 12 such as a ROM disc to the memory card 31 that is a (c) content recording medium.

Figure 2:
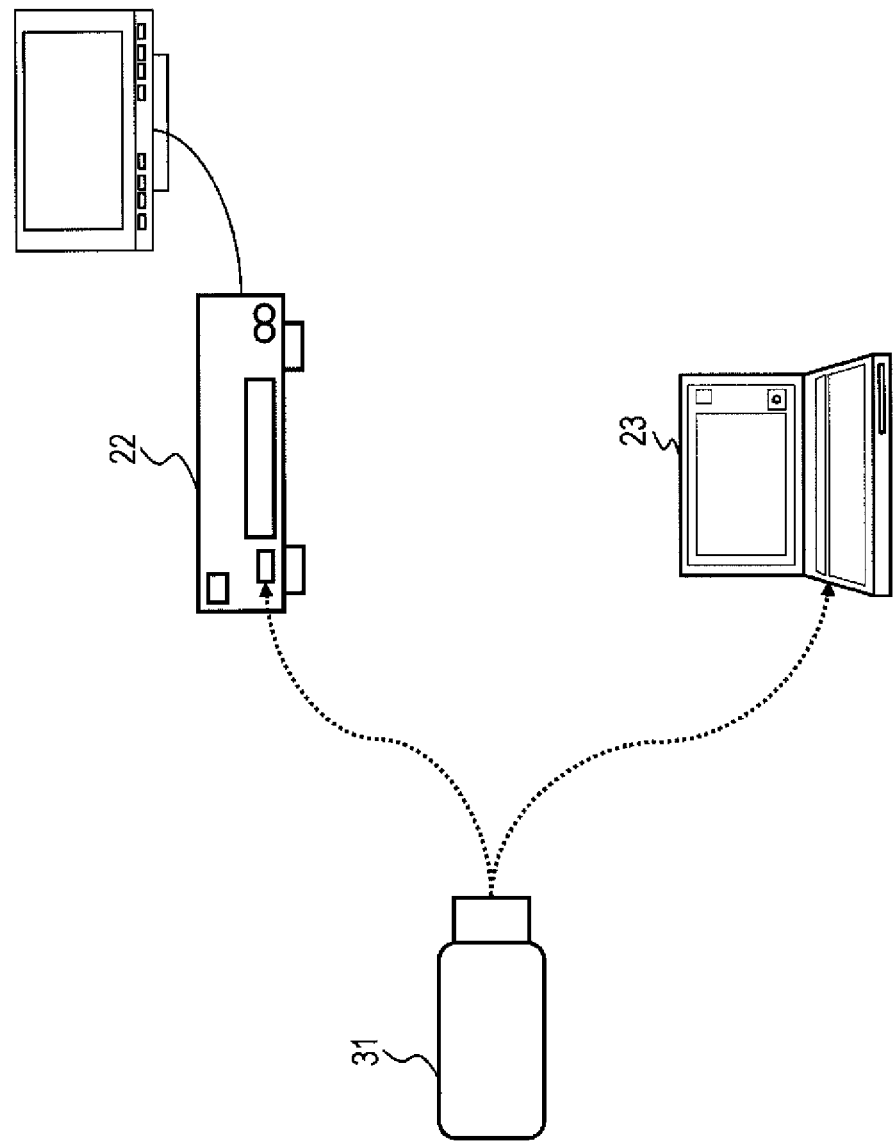
FIG. 2 is a diagram describing the use form of content recorded on a memory card.

The use form of the content recorded on the memory card 31 will be described with reference to FIG. 2.

The user reads and reproduces the content recorded on the memory card 31 by equipping the memory card 31, on which content is recorded, on, for example, the recording reproducer (CE apparatus) 22, the PC 23, or the like that are user apparatuses as (b) Content recording devices (hosts) described with reference to (b) of FIG. 1.

Here, in many cases, such content is recorded as encrypted content, and reproduction devices such as the recording reproducer (CS apparatus) 22 or the PC 23 perform content reproduction after executing decryption processing according to a predetermined sequence.

Here, an apparatus that reproduces the content recorded on the memory card 31 is not limited to the (b) content recording device (host) described with reference to FIG. 1, and may be another reproduction device (player). However, the reproduction device is, for example, an apparatus that is able to execute decryption processing and the like of the decrypted content according to a sequence regulated in advance, that is, an apparatus that has a stored program that executes a reproduction processing sequence regulated in advance. Here, the details of the content reproduction sequence will be described later.

2. Basic Configuration Example of Content and Data Provided to User of Related Art Next, a basic configuration example of content and data provided to a general user of the related art will be described with reference to FIG. 3.

Figure 3:
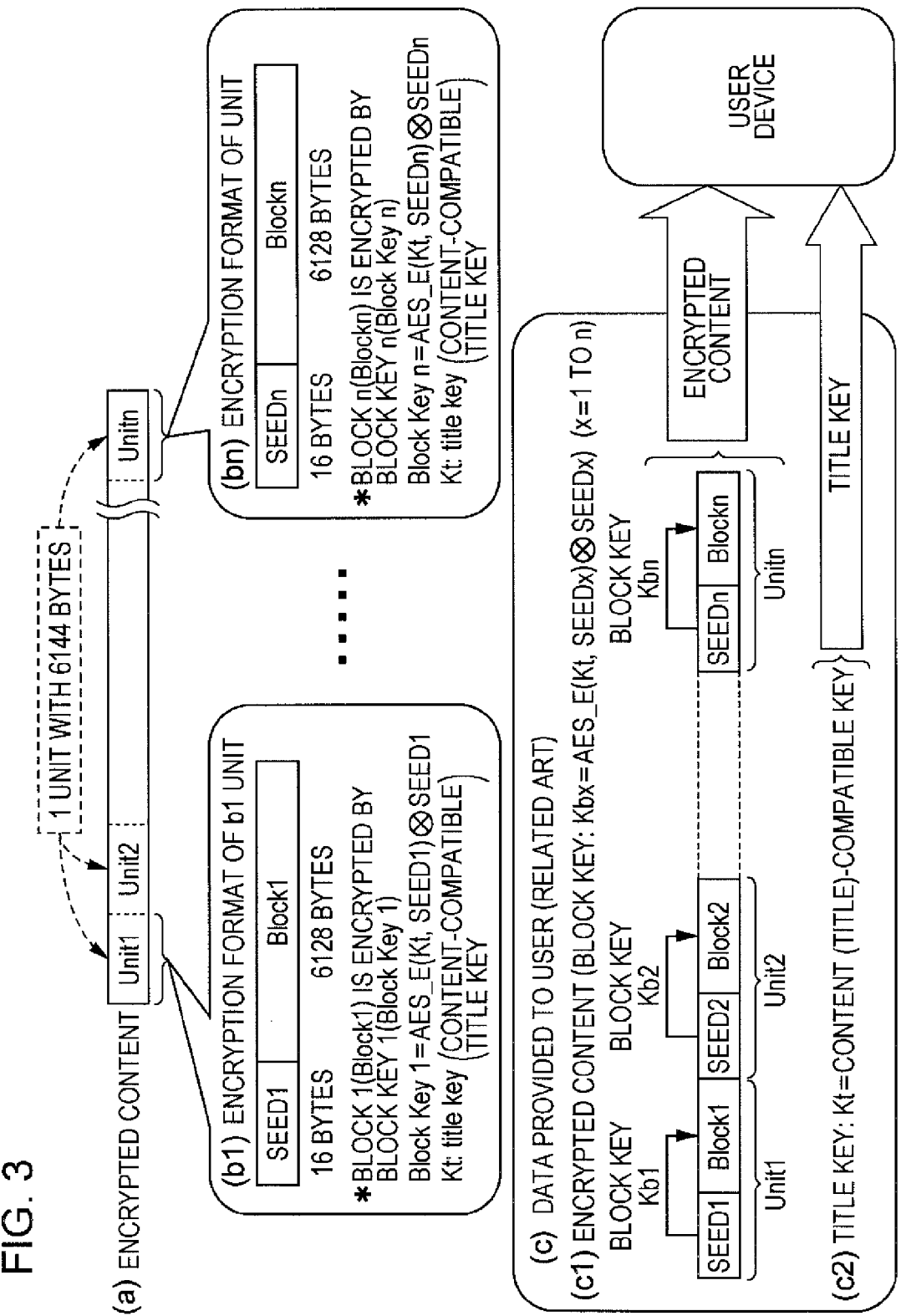
FIG. 3 is a diagram describing a basic configuration example of content and data provided to a general user of the related art.

The configuration illustrated in FIG. 3 is a basic configuration example of encrypted content according to the AACS (Advanced Access Content System) standard that is recorded on, for example, a Blu-ray (registered trademark) disc or the like. Here, as stated above, the AACS regulates a variety of standards for copyright protection of the content. As a typical encryption configuration of an AACS standard, there is a configuration that demarcates the content into units and applies a different encryption key to each unit. By adopting such an encryption configuration, use control of the content units becomes possible, and a strict and varied use control is realised.

Each of the data below is illustrated; in FIG. 3.
(a) Encrypted content
(b) Encryption format of each unit that configures the encryption content
(c) Data provided to the user (related art)

The (a) encryption content of FIG. 3 is content such as, for example, movies, and corresponds to the configuration of content recorded on, for example, a BD (Blu-ray (registered trademark) disc) or the like.

As illustrated in (a) FIG. 3, the content is demarcated into units. One unit includes data of 6144 bytes.

The encryption format by units is illustrated by (b) of FIG. 3.

Encryption formats for (b1) Unit1 and (bn): Unitn are illustrated in (b1).

Unit1 to Unitn have the same configuration, that is, include a SEED of 16 bytes and block data of 6128 bytes.

The SEED is used as data for encryption key generation, and the block is a data area that is encrypted by an encryption key generated by applying the SEED.

Specifically, a title key (Kt) that is a content-compatible encryption key and a block key (Kbx) than is an encryption key for the block using the seed (SEEDx) of each unit are generated for each unit x (x=1 to n), and the block (Block_x) is encrypted by the generated block key (Kbx).

That is, in the example illustrated in the drawing, the blocks 1 to n of each unit of 1 to n units is encrypted by different block keys (Kb1 to Kbn) generated using, respectively, different SEEDs 1 to n.

The content is encrypted content having a configuration as illustrated, by the (c1) encrypted content of FIG. 3.

Here, the block key (Kbx) is generated by, for example, the below operation processing.

$$Kbx=(AES\_E(Kt, SEEDx))(XOR)(SEEDx)$$

In the above expression, AES_E(Kt, SEEDx) represents the encryption processing (AES Encryption) of the SEEDx by the title key, and (XOR) represents an exclusive OR operation.

That is, the block key of each unit is calculated as the exclusive OR (XOR) operation result between the data (AES_E(Kt, SEEDx)) that is the SEED (SEEDx) of the Unitx encrypted by the title key (Kt) and the SEED (SEEDx).

Encryption of the block (blockx) of each unit is carried out using the unit-compatible block keys (Kbx) generated as above.

Encrypted content composed of a plurality of units having encrypted blocks that have different block keys applied by units as described above are provided to the user via a disc or a server.

An example of the data provided to the user is illustrated by (c) in FIG. 3. The data provided to the user includes the below data.
(c1) Encrypted content
(c2) Title key (Kt)

The (c1) encrypted content is encrypted content generated according to the above description, and is data that links encrypted blocks that are generated by the SEEDs and the title key and that applies the block keys.

The (c2) title key (Kt) is a title key (Kt) that is content-compatible.

A typical provision form of such (c1) encrypted content and (c2) title key (Kt) in the past has been to record on a disc or the like, or to provide to the user from a server.

In a case when decryption processing of encrypted content is performed, the user executes decryption of the blocks of each unit by generating block keys for each of the units and using the generated block keys. That is, content reproduction is executed by applying the expression for generating block keys described above and the expression below.

$$Kbx=(AES\_E(Kt, SEEDx))(XOR)(SEEDx)$$

using the title key (Kt) and the SEED data (SEEDx) of each block, generating the block keys x(Kbx) of each unit x, and executing decryption of the blocks by units.

Here, the SEED data is provided to the user as unencrypted plain text data.

However, in a case when the (c1) encryption content and the (c2) title key (Kt) are provided to the user as above, if the user subsequently leaks the title key (Kt), it becomes possible, for example, for a user with illegitimate content to decrypt copied content, and use control of the content becomes not possible.

In particular, nowadays, private individuals disclose a variety of information on networks, and if a title key is disclosed as one such piece of information, the title key immediately becomes usable by any person. In such a case, use control of the content becomes not possible.

In order to prevent such a situation, embodiments of the disclosure have changed the configuration of the data provided to the user.

3. Configuration Example of Memory Card as Content Recording Medium

Next, a configuration example of a memory card configured by a flash memory or the like used as a recording target of content will be described.

Figure 4:
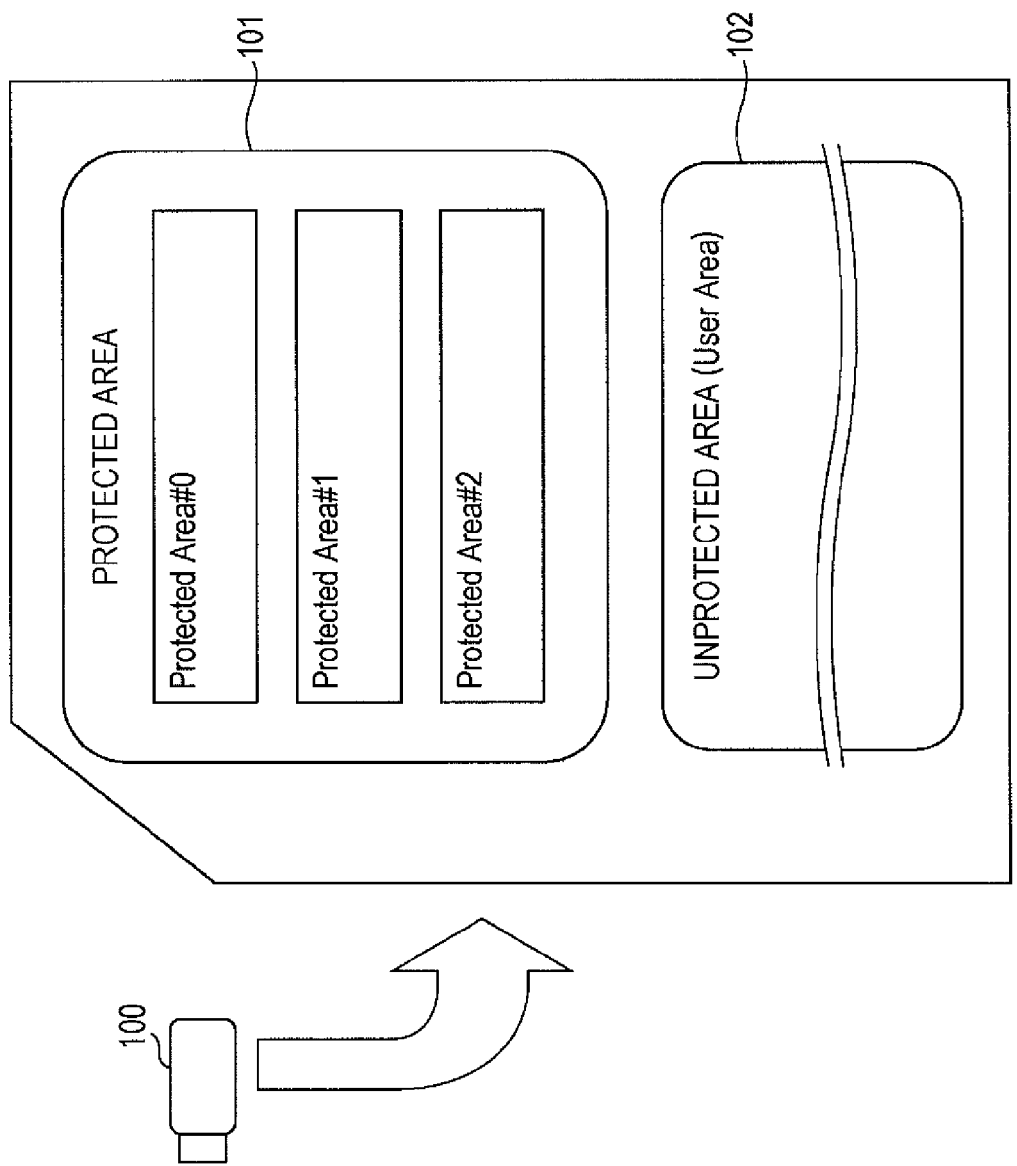
FIG. 4 is a diagram describing a specific configuration example of a memory area of a memory card.

A specific configuration example of the memory area of a memory card 100 is illustrated in FIG. 4.

The memory area of the memory card 100 includes, as illustrated in FIG. 4, the two areas of:
(a) Protected area 101; and
(b) Unprotected area (user area) 102.

The (b) unprotected area (user area) 102 is an area that is freely accessible by a recording reproduction device used by the user, and has content and general content management data or the like recorded thereon. The (b) unprotected area (user area) 102 is an area to and from which the user is able to freely write and read data.

On the other hand, the (a) protected area 101 is an area to which free access is not permitted.

For example, in a case when performing reading or writing of data by a recording reproduction device, a reproduction device, a server connected via a network, or the like used by the user, the permissibility of reading or writing for each device is determined by a program stored on the memory card 100 in advance.

The memory card 100 includes a data processing unit for executing a program stored in advance and a certification processing unit that executes certification processing, and the memory card 100 first performs certification processing of a device attempting to execute writing or reading of data to or from the memory card 100.

At the stage of the certification processing, whether or not access is permitted to each demarcated area of the protected area 101 is determined by receiving a device certificate (for example, a server certificate) such as a public key certificate from the partner device, that is, the access requesting device, and using the information entered thereon. Such determination processing is performed by units of the demarcated areas (the areas #0, #1, #2 . . . in the drawing) within the protected area 101 illustrated in FIG. 4, and only approved processing in approved areas is executed.

Figure 5:
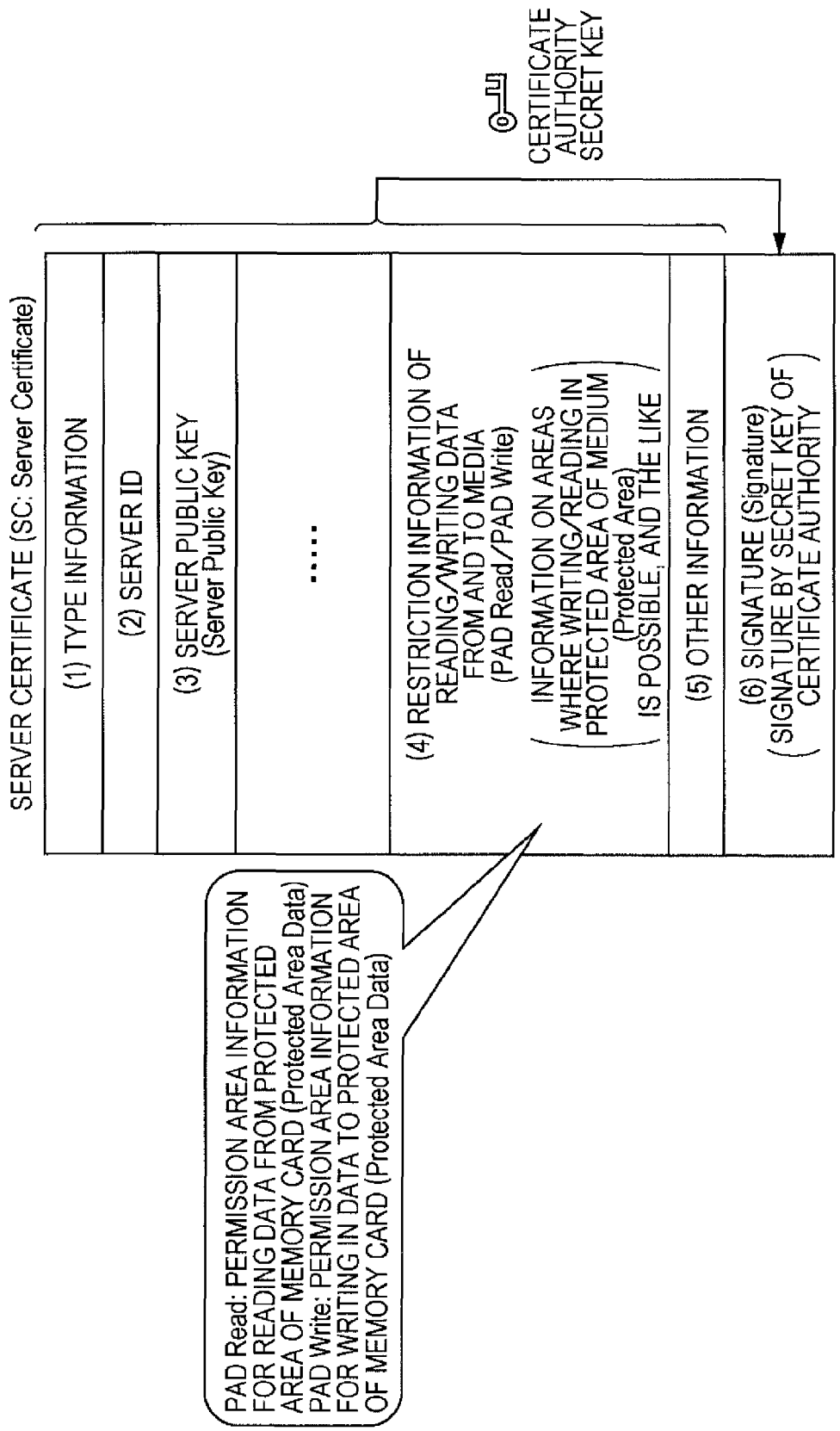
FIG. 5 is a diagram describing a data configuration example of a server certificate.

A data example of a server certificate of a server that is a device that executes data writing to a memory card is illustrated in FIG. 5. FIG. 5 is a diagram illustrating a data configuration example of a server certificate that a certificate authority provides to the server.

The server certificate is a certificate of a server that a certificate authority issues to a server for which content provision processing is approved, and is a certificate with a server public key and the like stored therein. The server certificate has a signature set by a certificate authority secret key, and is configured as data to which falsification is prevented.

As illustrated in FIG. 5, the following data is included in the server certificate.

(1) Type information
(2) Server ID
(3) Server public key
(4) Restriction information of reading/writing from and to media (PAD read/Pad write)
(5) Other information
(6) Signature Each data of the above (1) to (6) will be described below.
(1) Type Information The type information is information indicating the type of certificate or the type of content server and has information such as, for example, data indicating that the certificate is a server certificate, the type of server, for example, whether it is a music content provision server or a movie content provision server, or the like recorded thereon.
(2) Server ID The server ID is an area in which a server ID as server identification information is recorded.
(3) Server Public Key The server public key is a public key for the server. The server public key configures a key pair that follows, along with a server secret key provided to the server, a public key encryption system.
(4) Restriction Information of Reading/Writing from and to Media (PAD Read/Pad Write)

Restriction information of reading/writing from and to media (PAD read/Pad write) records information on demarcated areas in which data reading and writing is permitted within the protected area (PDA: protected area) 101 set in the memory area of a medium on which content is recorded, for example, the memory card 100 illustrated in FIG. 4.

The memory card performs, for example by referencing a recording field of a server certificate illustrated in FIG. 5 that is received from the server at the stage of the certification processing, for example, approval determination processing of writing and reading by units of the demarcated areas (the areas #0, #1, #2 . . . in the drawing) within the protected area 101 illustrated in FIG. 4, and permits execution only for approved processing in approved demarcated areas.

As illustrated in FIG. 5, as well as the data described above, (5) other information is recorded and (6) signatures generated by a secret key of the certificate authority for each of the data of (1) to (5) are recorded on the server certificate. A falsification prevention configuration is realized by the signatures.

In a case when the server certificate is used, use is performed by executing signature validation and verifying the legitimacy of the server certificate. Here, the signature validation is executed using a public key of the certificate authority.

Devices other than the server that perform requests for access to the protected area of the memory card, for example, a recording device, a reproduction device, and the like also store a host public key, retain a host certificate that has restriction information of reading/writing (PAD read/Pad write) from and to a medium illustrated by (4) in FIG. 5 recorded thereon, and present the host certificate to the memory card.

The memory card performs signature validation of the certificate presented by a device that performs access request, and after verifying the legitimacy of the certificate, writes by units of the demarcated areas (the areas #0, #1, #2 . . . in the drawing) within the protected area 101 illustrated in FIG. 4 referring to the record of reading/writing restriction information (PAD read/Pad write) in the certificate, performs approval determination processing of reading, and permits execution only for approved processing in approved demarcated areas.

As described above, restriction information of reading/writing (PAD read/PAD write) to a medium is set by, for example, the device that is attempting to access, for example, the content server, or by units of the recording reproduction device (host). Such information is recorded on the certificate of the server that is compatible with each device or the host certificate.

The memory card 100 verifies the recorded data of the server certificate or the host certificate according to a regulated program stored on the memory card 100 in advance, and performs processing to permit access only to areas where access approval is granted.

Setting examples of access restriction in a case when the device requesting access to the memory card is a server and a case when it is a host apparatus such as a reproduction device will be described with reference to FIG. 6.

Figure 6:
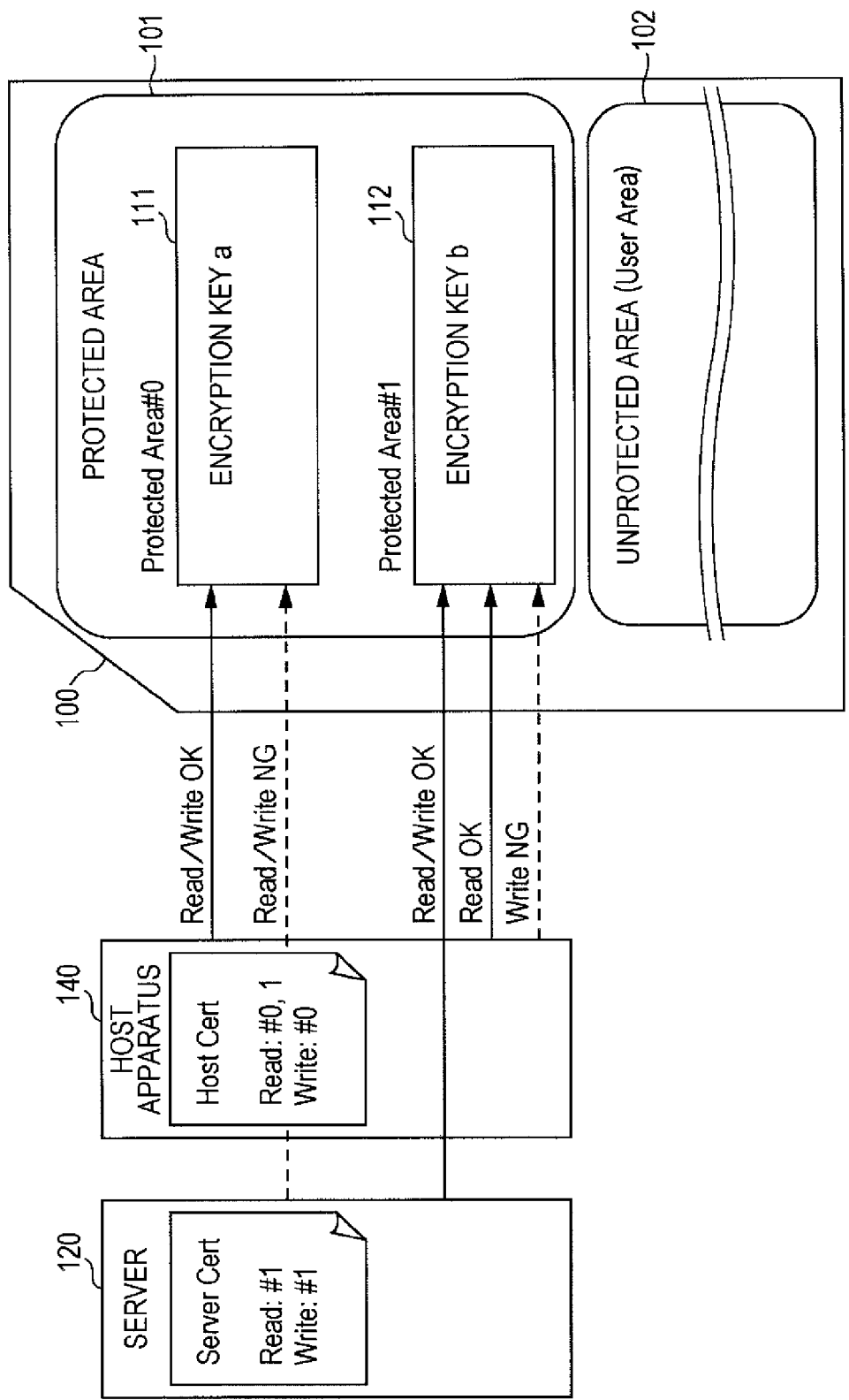
FIG. 6 is a diagram describing a specific example of access processing to a memory area of a memory card on which a device certificate is applied.

From the left, a server 120 that is a device requesting access to the memory card, a host apparatus 140, and the memory card 100 are illustrated in FIG. 6.

The server 120 is a server that executes, for example, content provision processing and writing processing of encrypted keys applied to content decryption.

The host apparatus 140 is a device that performs reproduction processing of content stored on the memory card 100, and is an apparatus that obtains the encryption keys recorded on the memory card for the decryption processing of the content.

The memory card 100 includes the protected area 101 and the unprotected area (user area) 102, and encrypted content and the like are recorded in the unprotected area (user area) 102.

The encryption keys applied to the decryption of the encrypted content is recorded in the protected area 101. Here, the encryption keys recorded in the protected area 101 include, for example, individual keys (Kind) that are different for each content recording processing. Use processing of the individual keys (Kind) will be described in detail later.

As described with reference to FIG. 4 above, the protected area 101 is demarcated into a plurality of areas.

In the example illustrated in FIG. 6, an example with two demarcated areas of a demarcated area #0 (protected area #0) 111 and a demarcated area #1 (protected area #1) 112 are illustrated.

The memory card 100 receives a device certificate (for example, a server certificate) such as a public key certificate from the partner device, that is, the access requesting device at the stage of certification processing with the access requesting device, and using the information recorded in the certificate, determines whether or not access to each of the demarcated areas of the protected area 101 is permitted. As a result of the determination processing, only approved processing in approved areas is executed.

For example, writing permitted area information (PAD write) recorded on the server certificate of the server is configured as a certificate on which approval for writing in to the demarcated area #1 (protected area #1) 112 is set. That is, as illustrated in the drawing, the writing permitted area information (PAD write) is configured with the setting as:

reading permission area: #1 writing permission area: #1.

Here, in the example illustrated in the drawing, a demarcated area to which writing is permitted is set so as for reading to also be permitted.

In addition, the host certificate retained by the host apparatus 140 that is, for example, a reproduction device that reads the encryption key recorded in the demarcated area #1 (protected area #1) 112 and executes content reproduction, is a certificate in which only approval for reading the demarcated area #1 (protected area #1) 112 is set, that is, as illustrated in the drawing, the host certificate is configured with the setting as:

reading permission area: #0, 1.

writing permission area: #0.

Approval for writing in to the demarcated area #1 (protected area #1) 112 is not set in the host certificate.

However, since the host certificate is set, when deleting content, to allow deletion of the encryption key corresponding to the deleted content, writing may be set to be approved with regard to deletion processing.

In so doing, the data processing unit of the memory card determines whether or not data writing and data reading from the access requesting device, to the protected area 101 is approved based on the device certificate.

4. Recording Reproduction Processing Example of Data and Content Provided to User According to Embodiment of Disclosure An example of recording reproduction processing of data provided to the user according to an example of the disclosure will be described with reference to FIG. 6 and subsequent drawings.

From the left, a (1) server 150 that executes content provision processing, a (2) recording device 160 that receives content and executes recording processing to a medium, a (3) recording medium 170 such as a memory card for content recording, and a (4) disc 180 on which content is recorded are illustrated in FIG. 6.

The recording medium 170 is compatible with the memory card 100 described with reference to FIG. 4, and includes a protected area 171 to which access is restricted depending on the apparatus, and an unprotected area (user area) 172 with no access restriction.

The example illustrated in FIG. 6 collectively illustrates the below two processing examples.

(a) processing of the recording device 160 receiving content provided from the server 150 and recording on the recording medium 170

(b) processing the recording device 160 reading the content recorded on the disc 180 and recording on the recording medium 170.

In either processing of (a) or (b), the recording device 160 executes communication with the server 150, obtains individual keys 151, and performs processing to record in the protected area of the recording medium 170.

Here, the individual keys 151 are keys that the server 150 generates for each recording processing of new content on the recording medium 170. For example, the server 150 generates and transmits individual keys (Kind) that are successively differed by random number generation processing, and performs processing to record in the protected area of the recording medium 170.

In the (a) processing of the recording device 160 receiving content provided from the server 150 and recording on the recording medium 170, processing is performed in the order of the steps S11, S12, S13a, S14, and S15 illustrated in FIG. 6.

In the (b) processing of the recording device 160 reading the content recorded on the disc 180 and recording on the recording medium 170, processing is performed in the order of the steps S11, S12, S13b, S14, and S15 illustrated in FIG. 6.

First, (a) processing of the recording device 160 receiving content provided from the server 150 and recording on the recording medium 170 will be described.

In step S11, the server 150 performs processing of recording the individual keys (Kind) 151 in the protected area 171 of the recording medium 170.

Before beginning the processing, cross certification is executed between the server 150 and the recording medium 170. At the stage of the certification processing, the recording medium 170 receives a device certificate (for example, a server certificate) such as a public key certificate from the server 150 that is the access requesting device, and using the information recorded on the certificate, determines whether or not access to each of the demarcated, areas of the protected area 171 is permitted. The determination processing is performed by units of the demarcated areas (the areas #0, #1, #2 . . . in the drawing) within the protected area as described in FIGS. 4 and 6, and only approved processing in approved areas is permitted.

The server 150 performs processing of recording the individual keys (Kind) 151 in the protected area 171 of the recording medium 170 with the permission of the recording medium 170 as a condition.

The result of recording in the protected area 171 is individual keys (Kind) 173 illustrated in FIG. 6.

Next, in step S12, the recording device 160 reads the individual keys (Kind) 173 recorded in the protected area 171 of the recording medium 170.

Here, before the reading process, cross certification is executed between the recording device 160 and the recording medium 170. At the stage of the certification processing, the recording medium 170 receives a device certificate (for example, a host certificate) such as a public key certificate from the recording device 160 that is the access requesting device, and using the information recorded on the certificate, determines whether or not access to each of the demarcated areas of the protected area 171 is permitted. The determination processing is performed by units of the demarcated areas (the areas #0, #1, #2 . . . in the drawing) within the protected area as described in FIGS. 4 and 6, and only approved processing in approved areas is permitted.

The recording medium 160 performs processing of reading the individual keys (Kind) 173 from the protected area 171 of the recording medium 170 with the permission of the recording medium 170 as a condition.

Next, in step S13*a*, the recording device 160 receives content 152 from the server 150. Here, the content is plain text content that is not encrypted, or is encrypted content encrypted by a content-compatible title key or the like, that is, any of the forms of encrypted content described with reference to (c1) of FIG. 3.

Here, the server 150 encrypts the title key and records on the recording medium 170 in a case when providing encrypted content encrypted by a title key. Further, similarly to the above-described recording processing of the individual keys to the recording medium, processing of recording a binding key that is an encrypted key of the title key in the protected area 171 of the recording medium 170 is executed. Here, a specific processing example will be described later.

Here, cross certification processing is also executed between the server 150 and the recording device 160 before the transceiving of data, sharing of a session key is performed in the certification processing, and the transceiving data is encrypted by the session key as necessary and is transferred. In a case when transceiving plain text content, the server 150 encrypts the plain text content with the session key and transmits it to the recording device 160. In a case when data that is encrypted by the session key is received, the recording device 160 decrypts the data by the shared session key and proceeds to the next step.

Step S14 is encryption processing of content executed in the recording device 160. The content encryption processing is encryption processing by the individual keys (Kind) 173 read from the protected area 171 of the recording medium 170 in step S12.

Here, in a case when the content received from the server is plain text content, encrypted content that is encrypted by the individual keys is generated.

On the other hand, in a case when the content received from the server is encrypted content that is encrypted by the title key or the like (for example, the encrypted content illustrated in (c1) of FIG. 3), encrypted content that is the encrypted content further re-encrypted by individual keys is generated.

The encryption processing of content executed by the recording device 160 in step S14 may be set to encrypt the entirety of the content received from the server 150 using the individual keys (Kind), or may have a configuration encrypting only a portion thereof by applying the individual keys.

An encryption processing example of such a portion will be described with reference to FIGS. 8 and 9.

Figure 8:
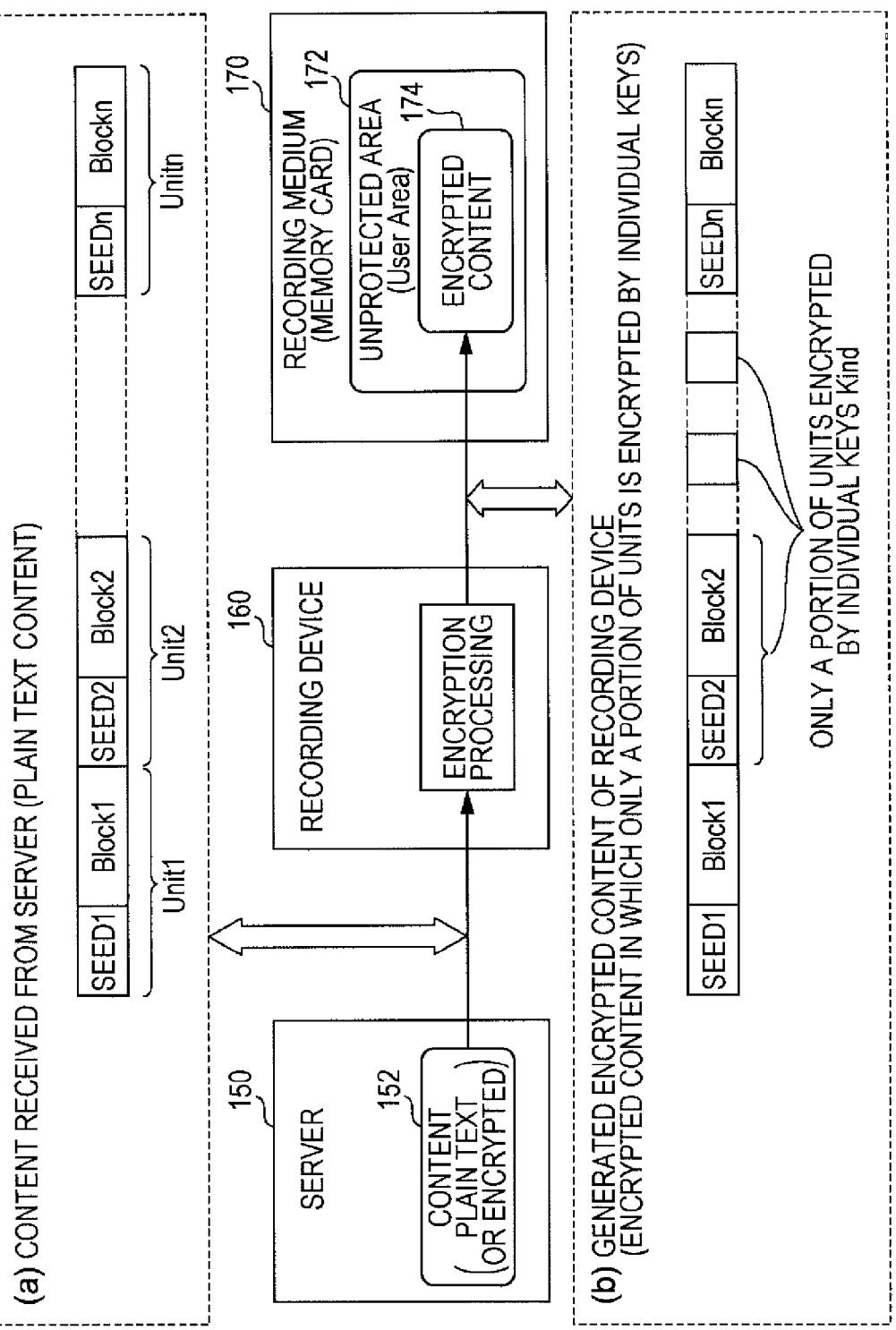
FIG. 8 is a diagram describing an encryption processing example of content on which individual keys are applied in a recording device according to one example of the disclosure.

FIG. 8 is a processing example in a case when the content received from the server is plain text content.

The content examples of:
(a) Content received from the server (plain text content); and
(b) Generated encrypted content of the recording device (encrypted content in which only a portion of the units is encrypted by the individual keys) are illustrated in FIG. 8.

The recording device 160 may, in this manner, have a configuration encrypting only a portion of the content received from the server by applying individual keys.

However, in a case when only a portion is selectively encrypted by the individual keys (Kind), encrypted portions (for example, unit identifiers) are created as encrypted area identification information corresponding to the encrypted content and recorded on a recording medium along with the encrypted content.

When reproducing, decryption processing is executed by referring to the encrypted area identification information.

Figure 9:
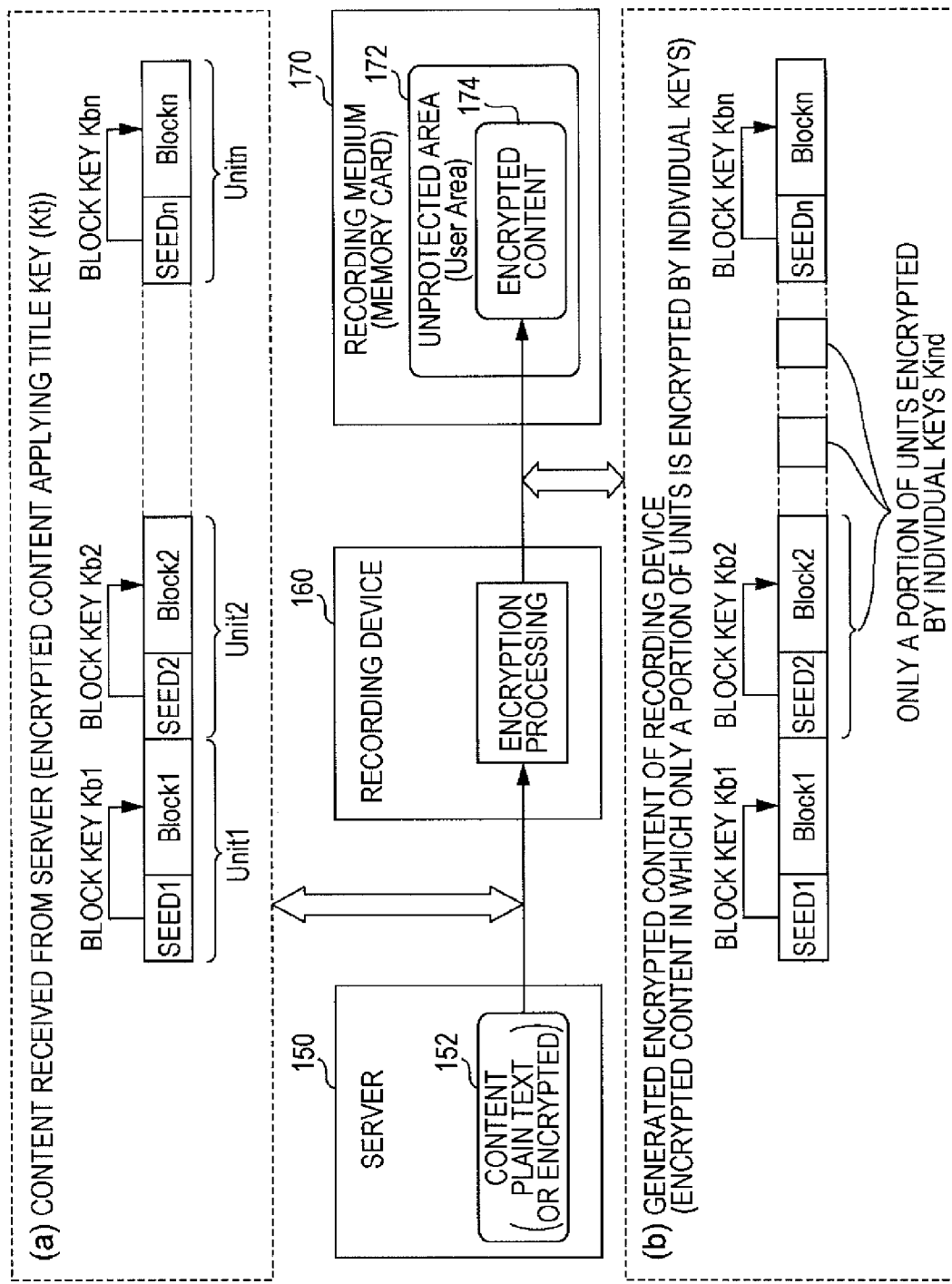
FIG. 9 is a diagram describing an encryption processing example of content on which individual keys are applied in a recording device according to another example of the disclosure.

FIG. 9 is a processing example in a case when the content received from a server is encrypted content encrypted by a block key generated using a title key and a SEED. The content examples of:
(a) Content received from the server (encrypted content applying a title key (Kt)); and
(b) Generated encrypted content of the recording device (encrypted content in which only a portion of the units is encrypted by the individual keys) are illustrated in FIG. 9.

The recording device 160 may, in this manner, have a configuration encrypting only a portion of the content received from the server by applying individual keys.

Also by the setting of FIG. 9, encrypted portions (for example, unit identifiers) are created as encrypted area identification information corresponding to the encrypted content and recorded on a recording medium along with the encrypted content. When reproducing, decryption processing is executed by referring to the encrypted area identification information.

Next, in step S15, the recording device 160 records the generated encryption content in the unprotected area (user area) 172 of the recording medium 170. Encrypted content 174 illustrated in the drawing is thus recorded.

With such processing, although the server 150 successively generates and transmits only individual keys for each content provision processing, with regard to the provided content, it is possible for the content to be provided to all recording devices as common content. Therefore, the processing load of the server is not greatly increased.

Here, the server 150 stores the generated and transmitted information of the individual keys in a memory unit by generating device information (client information) to which individual keys and content are provided or management information that is recorded corresponding to the user information.

For example, in a case when individual keys are leaked, it is possible to investigate the source of the leak by specifying the device (client) or the user that has transmitted the individual keys or the content along with the individual keys, based on the management information. Here, the details of the management information will be described later.

Next, processing of the recording device 160 reading the content recorded on the (b) disc 180 and recording on the recording medium 170 will be described.

Such processing is processing of recording the content recorded on the disc 180 on another recording medium under the management of the server, and is processing known as managed copying (MC).

The processing of steps S11 to S12 performs the same processing as when the content download processing from the server 150 is executed.

That is, in step S11, the server 150 performs processing of recording the individual keys (Kind) 151 in the protected area 171 of the recording medium 170.

Here, before the processing of step S11, the recording device 160 transmits information on the content to be copied from the disc 180, for example, the disc ID or the content ID, to the server 150. The server 150 determines whether or not to permit the copying based on such information, and in a case when it is permitted, executes transmission and recording processing of the individual keys.

Here, before beginning the recording processing of the individual keys, cross certification is executed between the server 150 and the recording medium 170. At the stage of the certification processing, the recording medium 170 receives a device certificate (for example, a server certificate) such as a public key certificate from the server 150 that is the access requesting device, and using the information recorded on the certificate, determines whether or not access to each of the demarcated areas of the protected area 171 is permitted. The determination processing is performed by units of the demarcated areas (the areas #0, #1, #2 . . . in the drawing) within the protected area as described in FIGS. 4 and 6, and only approved processing in approved areas is permitted.

The server 150 performs processing of recording the individual keys (Kind) 151 in the protected area 171 of the recording medium 170 with the permission of the recording medium 170 as a condition.

The result of recording in the protected area 171 is the individual keys (Kind) 173 illustrated in FIG. 6.

Next, in step S12, the recording device 160 reads the individual keys (Kind) 173 recorded in the protected area 171 of the recording medium 170.

Here, before the reading process, cross certification is executed between the recording device 160 and the recording medium 170. At the stage of the certification processing, the recording medium 170 receives a device certificate (for example, a host certificate) such as a public key certificate from the recording device 160 that is the access requesting device, and using the information recorded on the certificate, determines whether or not access to each of the demarcated areas of the protected area 171 is permitted. The determination processing is performed by units of the demarcated areas (the areas #0, #1, #2 . . . in the drawing) within the protected area as described in FIGS. 4 and 6, and only approved processing in approved areas is permitted.

The recording medium 160 performs processing of reading the individual keys (Kind) 173 from the protected area 171 of the recording medium 170 with the permission of the recording medium 170 as a condition.

Next, in step S13b, the recording device 160 reads content 181 from the disc 180. Here, the content is plain text content that is not encrypted, of is encrypted content encrypted by a content-compatible title key or the like, that is, any of the forms of encrypted content described with reference to (c1) of FIG. 3.

Here, in a case when performing processing of encrypted content encrypted by a title key, processing of recording on the recording medium 170 is executed by receiving the title key from the server 150 or reading from the disc 180.

Step S14 is encryption processing of content executed in the recording device 160. The content encryption processing is encryption processing by the individual keys (Kind) 173 read from the protected area 171 of the recording medium 170 in step S12.

Here, in a case when the content read from the disc 180 is plain text content, encrypted content that is encrypted only by individual keys is generated.

On the other hand, in a case when the content read from the disc 180 is encrypted content (for example, encrypted content illustrated in (c1) of FIG. 3) encrypted by a title key or the like, encrypted content that is the encrypted content further re-encrypted by individual keys is generated.

Here, the encryption processing of content that the recording device 160 executes in step S14 may be set, as described with reference to FIGS. 8 and 9, to encrypt the entirety of the content using the individual keys (Kind), or may have a configuration encrypting only a portion thereof by applying the individual keys.

Next, in step S15, the recording device 160 records the generated encrypted content in the unprotected area 172 of the recording medium 170. The encrypted content 174 illustrated in the drawing is thus recorded.

With the processing, the server 150 successively generates and transmits only the individual keys for every content copy processing.

Here, the server 150 stores the generated and transmitted information of the individual keys in a memory unit by generating device information (client information) to which individual keys and content are provided or management information that is recorded corresponding to the user information.

For example, in a case when individual keys are leaked, it is possible to investigate the source of the leak by specifying the device (client) or the user that has transmitted the individual keys or the content along with the individual keys, based on the management information. Here, the details of the management information will be described later.

Next, decryption reproduction processing of the content recorded on the recording medium 170 will be described with reference to FIG. 10.

The recording medium 170 and a reproduction device 190 are illustrated in FIG. 10.

Figure 7:
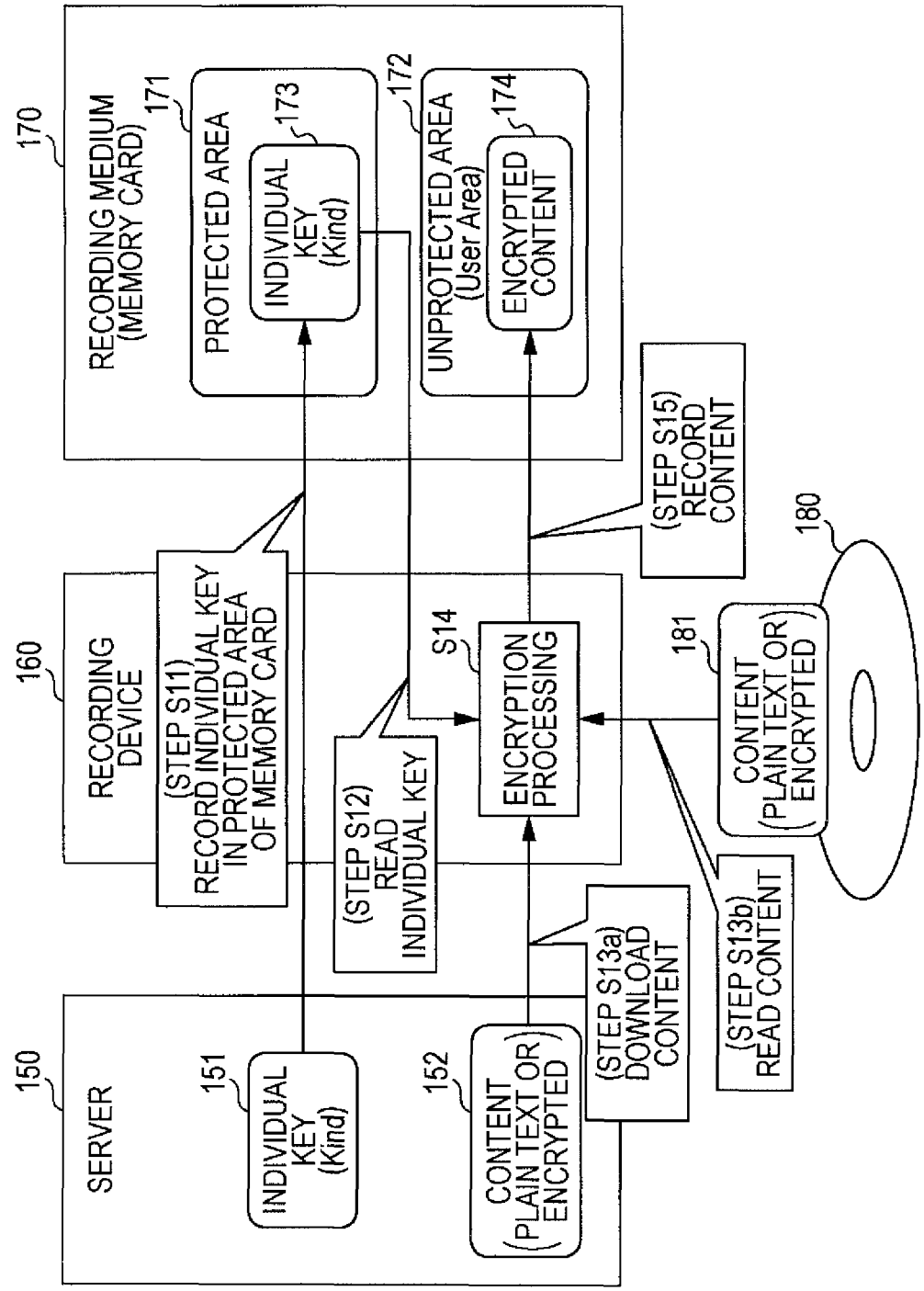
FIG. 7 is a sequence diagram describing a content provision sequence between a server and a client according to one example of the disclosure.

The recording medium 170 is the recording medium 170 illustrated in FIG. 7, and is a medium on which, according to the sequence described with reference to FIG. 7 (steps S11 to S15), the individual keys 173 obtained from the server 150 and the encrypted content 174 that is the download content from the server 150 or the copy content from the disc 180 encrypted by individual keys are recorded.

The reproduction device 190 is a reproduction device that is a PC, a reproduction apparatus, or the like of the user.

The reproduction processing is executed in the order of steps S21 to S23 illustrated in FIG. 10.

First, in step S21, the reproduction device 190 reads the individual keys (Kind) 173 from the protected area 171 of the recording medium 170.

Here, before the reading process, cross certification between the reproduction device 190 and the recording medium 170 is executed. At the stage of the certification processing, the recording medium 170 receives a device certificate (for example, a host certificate) such as a public key certificate from the reproduction device 190 that is the access requesting device, and using the information recorded on the certificate, determines whether or not access to each of the demarcated areas of the protected area 171 is permitted. The determination processing is performed by units of the demarcated areas (the areas #0, #1, #2 . . . in the drawing) within the protected area as described in FIGS. 4 and 6, and only approved processing in approved areas is permitted.

The reproduction device 190 performs processing of reading the individual keys (Kind) 173 from the protected area 171 of the recording medium 170 with the permission of the recording medium 170 as a condition.

Next, in step S22, the reproduction device 190 reads the encrypted content 174 that is encrypted by the individual keys (Kind) from the protected area 172 of the recording medium 170.

Next, in step S23, the reproduction device 190 executes decryption processing of the encrypted content 174 by applying the individual keys (Kind) read from the protected area 172 of the recording medium 170 and reproduces content 191.

Here, in a case when the decryption result by the individual keys is not plain text content but is content (encrypted content illustrated in (c1) of FIG. 3) that is encrypted by a title key or the like, the content 191 is reproduced executing further decryption processing using the title key and performing decryption of the content.

According to an embodiment of the disclosure, a server generates the individual keys (Kind) that are different by units of the provision processing of content or by units of the copy processing of the content from a disc, and the generated individual keys (Kind) are provided to a recording medium.

A conceptual diagram of data provided to each client from a server is illustrated in FIG. 11

As illustrated in FIG. 11, when download processing content, the server 150 provides (a) content (plain text or encrypted content)
  to, for example, clients 1 and 2 to which content with the same title is provided, as data that is common to each client.

Here, in a case when the content is provided as encrypted content using a title key, a (b) title key (Kt)
  is also provided as common data to each client.

The server 150 provides, as data that is different by each client unit, (c) individual keys (Kind).

When processing to copy and record content from a disc, the server 150 only provides (a) individual keys (Kind)
  to, for example, the clients 1 and 2 to which content with the same title is provided, as data that is common to each client.

However, in a case when the content is copied as encrypted content using a title key, a (b) title key (Kt)
  is provided as common data to each client.

Different encrypted content that is encrypted by individual keys are recorded on the recording media of the clients 1, 2 . . . , even in a case when, for example, download or copy processing of content that is encrypted by a title key is executed.

Therefore, even if, for example, the title key is leaked and becomes usable by an unspecified number of users, the individual keys are data that is different by units of clients (units of transmission content), and as long as such individual data does not become usable by an unspecified number, illegitimate use of the content does not spread.

In addition, since the individual keys are managed by the server along with the transmission destination information, even in the worst case when individual keys or an encrypted SEED that have spread illegitimately are discovered, it becomes possible to specify the delivery destination of the individual keys.

A data configuration example of the management information retained in a memory section of the server is illustrated in FIG. 12.

As illustrated in FIG. 12, the management information includes, for example, information such as: a unique ID that corresponds to the transmission content; transmission content information; individual key (Kind) information; transmission destination information; transmission user information; and transmission time and date information.

In a case when download or copy processing of content that is encrypted by a title key is executed, the title key (Kt) information is also registered.

Here, as the transmission destination information, the recording device 160 and the recording medium 170 described with reference to FIG. 7 may be set to be individually registered. Alternatively, only one may be set to be registered.

The individual key (Kind) information has different data recorded for all entries. Here, in a case when the user of the transmission destination is the same, the same individual keys may be used. In such a case, the individual keys are set as keys that are different not by units of transmission processing but by units of the transmission destination user.

In such a case, it is still possible to specify a user as a leak source by collating the individual keys in a case when there is illegitimate leaking of data.

Here, the example of the management information illustrated in FIG. 12 is one example, not all such information may be included, and, further, information other than such information may be retained as management information.

In this manner, in the configuration of an embodiment of the disclosure, a server that performs content transmission or content copy processing management has a configuration performing processing to record, in the protected area of a recording medium as the content recording target, individual keys (Kind) applied as the encryption keys of content.

The individual keys (Kind) generated and provided as different keys for every new content download processing or content copy processing, and the individual key information is recorded and managed on the server, along with the provision destination information, as management information.

Due to such processing, for example, even if a content-compatible title key is leaked, since content decryption is not possible with only the title key, illegitimate use of content is prevented. Further, in a case when individual keys are leaked, it is possible to specify the transmission destination based on the management information, and it is possible to investigate the source of the leak of the individual keys.

5. Processing Sequence of Processing Executed in Server and Client

Next, a processing sequence of processing executed on the server and the client will be described with reference to the flowcharts of FIG. 13 and subsequent drawings.

(5-1) Data Processing Sequence in Server

First, the processing sequence on a server of providing content to a client will be described with reference to the flowchart illustrated in FIG. 13.

Figure 13:
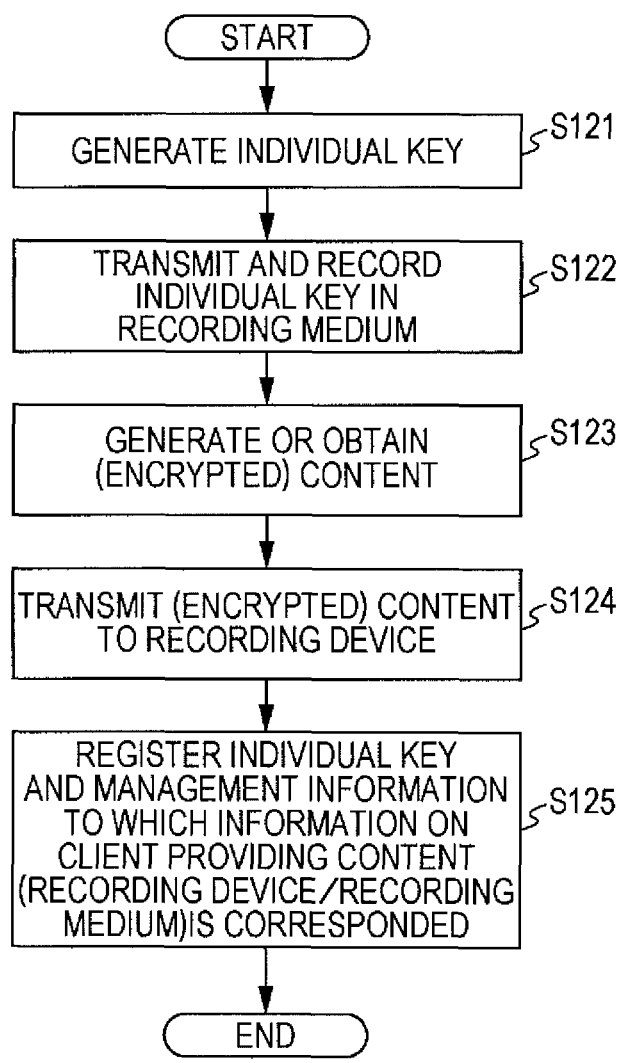
FIG. 13 is a diagram illustrating a flowchart describing a processing sequence of content provided to a client by a server.

The processing illustrated in FIG. 13 is processing executed under the control of a data processing unit of the server.

The individual keys (Kind) are generated in step S121. The individual key generation processing is executed, for example, by random number generation processing.

Next, in step S123, the individual keys are transmitted to a recording medium and recording processing is performed. Here, the server performs processing of recording the individual keys (Kind) in the protected area 171 of the recording medium.

Here, before beginning such processing, the server and the recording medium execute cross certification. At the stage of the certification processing, the recording medium receives a device certificate (for example, a server certificate) such as a public key certificate from the server that is the access requesting device, and using the information recorded on the certificate, determines whether or not access to each of the demarcated areas of the protected area is permitted. The determination processing is performed by units of the demarcated areas (the areas #0, #1, #2 . . . in the drawing) within the protected area as described in FIGS. 4 and 6, and only approved processing in approved areas is permitted.

The server performs processing to record the individual keys (Kind) in the protected area of the recording medium with the permission of the recording medium as a condition.

Next, in step S124, generation or obtaining of content is performed. Such content is plain text content that is not encrypted or is encrypted content that is encrypted by applying a title key or the like, that is, it is the encrypted content illustrated by (c) in FIG. 3. In a case when the content is the encrypted content illustrated by (c) in FIG. 3, it is content that is encrypted by applying a block key (Kb) that is block data by units generated by the SEED and the title key of the unit.

Next, in step S125, the content generated or obtained in step S124 is transmitted to the recording device. Here, in a case when, for example, the provided content is plain text content, it is preferable to perform encryption by a session key generated by certification processing executed between the server and the recording device.

Finally, in step S126, a management information entry in which the individual keys (Kind) and the content provision target client information are made to correspond is generated and stored in the memory unit.

The management information is the management information described earlier with reference to FIG. 12.

Here, in a case when the content provided to the recording device in step S124 is content that is encrypted using a title key, processing of recording on the recording medium is also performed for the title key. A specific example of such processing will be described later.

(5-2) Content Recording Sequence in Recording Device and Recording Medium

Next, a processing sequence of recording content received from a server or content read from a disc on a recording medium such as a memory card will be described with reference to the flowchart illustrated in FIG. 14.

Figure 14:
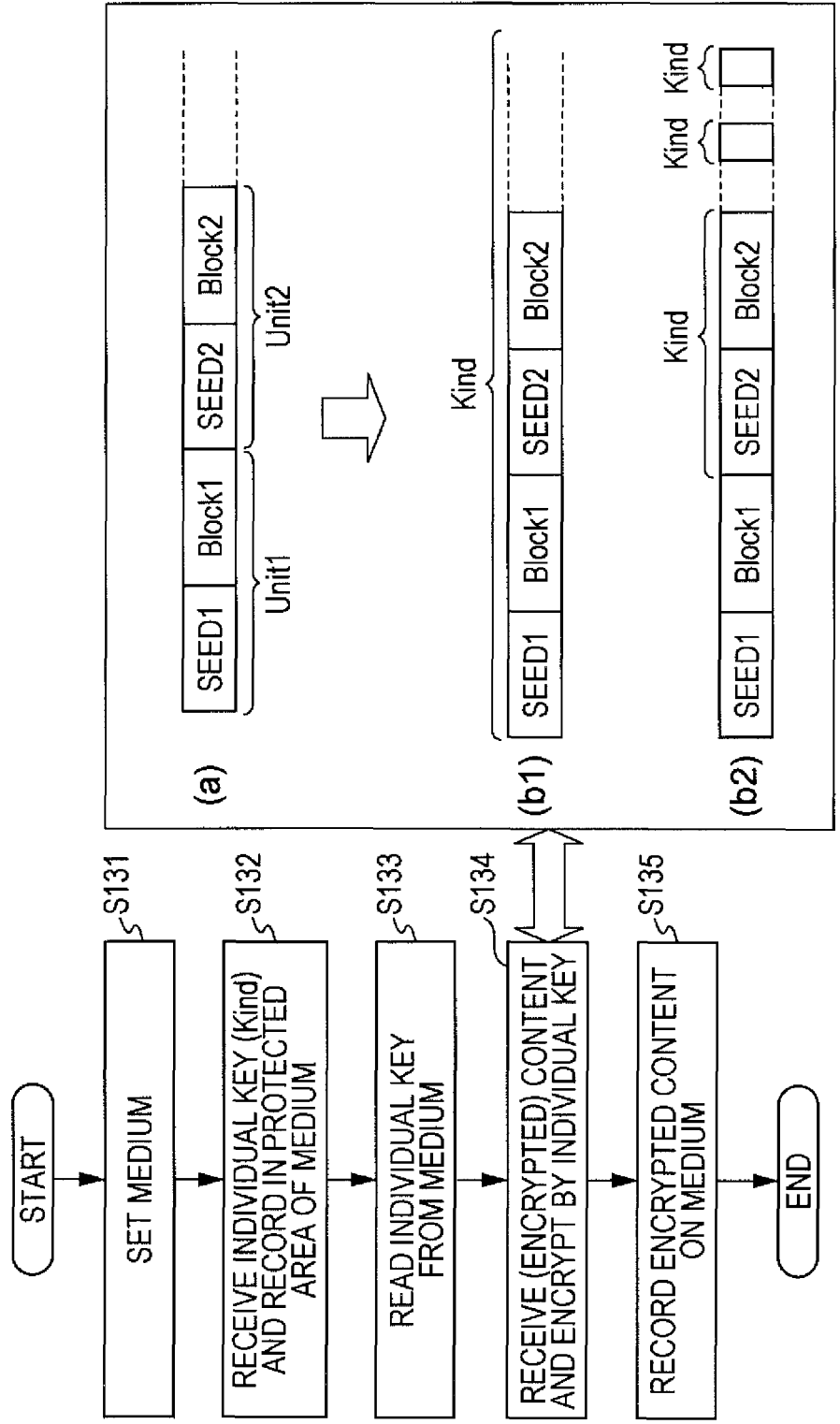
FIG. 14 is a diagram illustrating a flowchart describing a content recording sequence in a recording device.

The processing illustrated in FIG. 14 is processing executed under the control of the data processing unit of a recording device to which a memory card or the like is equipped or of a recording medium such as a memory card itself.

First, a medium on which content is to be recorded is set in a recording device in step S131. For example, the memory card 31 illustrated in FIG. 1 is set in a PC or the like that is the recording device.

In step S132, the individual keys (Kind) are received from the server and recorded in the protected area of the medium. Here, as prerequisites for such processing, cross certification is executed between the server and the recording medium, the recording medium verifies the right of access to the protected area recorded on a server certificate received from the server, and the individual keys (Kind) are written into demarcated areas in which the writing authority of the server is verified.

Next, in step S133, the recording device reads the individual keys (Kind) written into the protected area of the recording medium. Here, as prerequisites for such processing, cross certification is executed between the recording device and the recording medium, the recording medium verifies the right of access to the protected area recorded on a host certificate received from the server, and reading processing from only the demarcated areas in which the reading authority of the recording device is verified is executed.

Next, in step S134, the recording device receives, from the server, content that is encrypted by a title key or the like, or content that is encrypted by a session key, and in a case when encrypted by the session key, encryption is performed by the individual keys (Kind) after performing decryption with the session key.

An example of such encryption processing is illustrated as (a), (b1), and (b2)) in FIG. 14.

(a) illustrates the content received from the server.

(b1) is an example of the entire received content that is encrypted with the individual keys (Kind).

(b2)) is an example of a portion of the received content that is selectively encrypted.

The example of encryption illustrated in (b2)) corresponds to the example of partial encryption described with reference to FIGS. 8 and 9 earlier.

Here, in a case when only a portion is selectively encrypted by the individual keys (Kind) as in (b2)), the encrypted portion (for example, unit identifier) is created as encrypted area identification information that is compatible with encrypted content and is recorded on the recording medium along with the encrypted content.

When reproducing, decryption processing is executed by referring to the encrypted area identification information.

Finally, in step S135, the recording device records the encrypted content on a recording medium. Here, the recording processing is executed as processing of writing into the unprotected area (user area) of the recording medium.

Further, in a case when the partial encryption illustrated in (b2) is performed, the encrypted portion (for example, unit identifier) is created as encrypted area identification information that is compatible with encrypted content and is recorded on the recording medium along with the encrypted content.

(5-3) Content Reproduction Sequence in Reproduction Device

Next, a content reproduction sequence of the reproduction device will be described with reference to the flowchart illustrated in FIG. 15.

Figure 15:
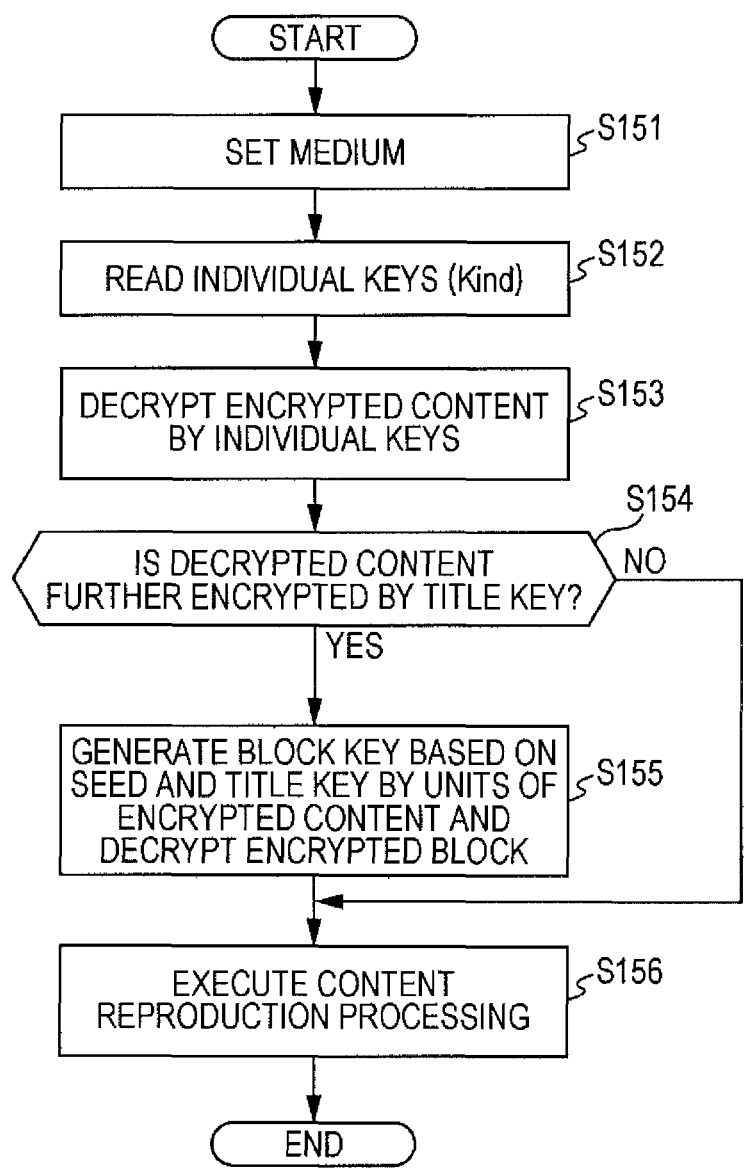
FIG. 15 is a diagram illustrating a flowchart describing a content reproducing sequence in a reproduction device.

The processing illustrated in FIG. 15 is processing that is executed under the control of the data processing unit of the reproduction device.

A medium on which the content is recorded is set. In the reproduction device in step S151. For example, the memory card 31 illustrated in FIG. 1 is set in the recording reproducer 22, the PC 23, or the like that is the reproduction device.

Next, in step S152, the individual keys (Kind) written into the protected area of the recording medium is read. Here, as prerequisites for such processing, cross certification is executed between the reproduction device and the recording medium, the recording medium verifies the right of access to the protected area recorded on a host certificate received from the reproduction device, and reading processing from only the demarcated areas in which the reading authority of the recording device is verified is executed.

Next, in step S153, the encrypted content is read from the recording medium and decrypted applying the individual keys (Kind).

Here, in a case when, as in (b2) of FIG. 14 described earlier, only a portion of the encrypted content is selectively encrypted by the individual keys (Kind), decryption processing is executed by reading, from the recording medium, the encrypted area identification information on which the area information of the encrypted portion (for example, unit identifier) is recorded and referring to the encrypted area identification information.

Next, in step S154, it is determined whether or not the content decrypted by the individual keys (Kind) is further encrypted by a title key or the like.

In a case when the content decrypted by the individual keys (Kind) is plain text content, the determination of step S154 becomes NO, step S156 is proceeded to, and reproduction processing is transitioned to.

In a case when the content decrypted by the individual keys (Kind) is not plain text, the determination of step S154 becomes YES, and step S155 is proceeded to.

In step S155, encrypted blocks are decrypted by generating block keys based on the SEED and the title key in units of the encrypted content.

The generation of the block keys is performed, as described earlier, by the expression below.

$$Kbx = (AES\_E(Kt, SEEDx))(XOR)(SEEDx)$$

In the above expression, x represents the block identifier, AES_E(Kt, SEEDx) represents the encryption processing (AES Encryption) of the SEEDx by the title key, and (XOR) represents an exclusive OR operation.

That is, the block key of each unit is obtained as the exclusive OR operation result between the data (AES_E(Kt, SEEDx)) that is the SEED of the Unit encrypted by the title key (Kt) and the SEED.

In this manner, content reproduction processing is executed in step S156 by performing decryption of each block by the block keys in step S155.

In the processing of an embodiment of the disclosure, a server is set to provide individual keys (Kind) that are set to be different for each content download processing or content copy processing, and a recording device is set to encrypt and record download content or copy content on a recording medium by applying the individual keys.

By such a setting, even in a case when, for example, an act such as leaking or disclosing the title key that corresponds to content is performed, as long as the individual keys are not obtained, decryption is not possible.

In addition, in a case when the individual keys are leaked, it is possible to ascertain and specify the source of the leak by analyzing the configuration of the individual key data and collating with the registration information of the management information of the server (refer to FIG. 12).

6. Content Provision Processing Sequence when Title Key is Used and when Title Key is Not Used In the description given above, with regard to content provided by a server and content read from a disc, it has been described that there are two ways of a case when the content is encrypted content that is encrypted using a title key, or a case when the content is plain text content. Below, with regard to the two processing examples, specific sequence examples will be described individually as processing examples in a case when content is provided from a server. The below processing examples will be described in order.

Figure 16:
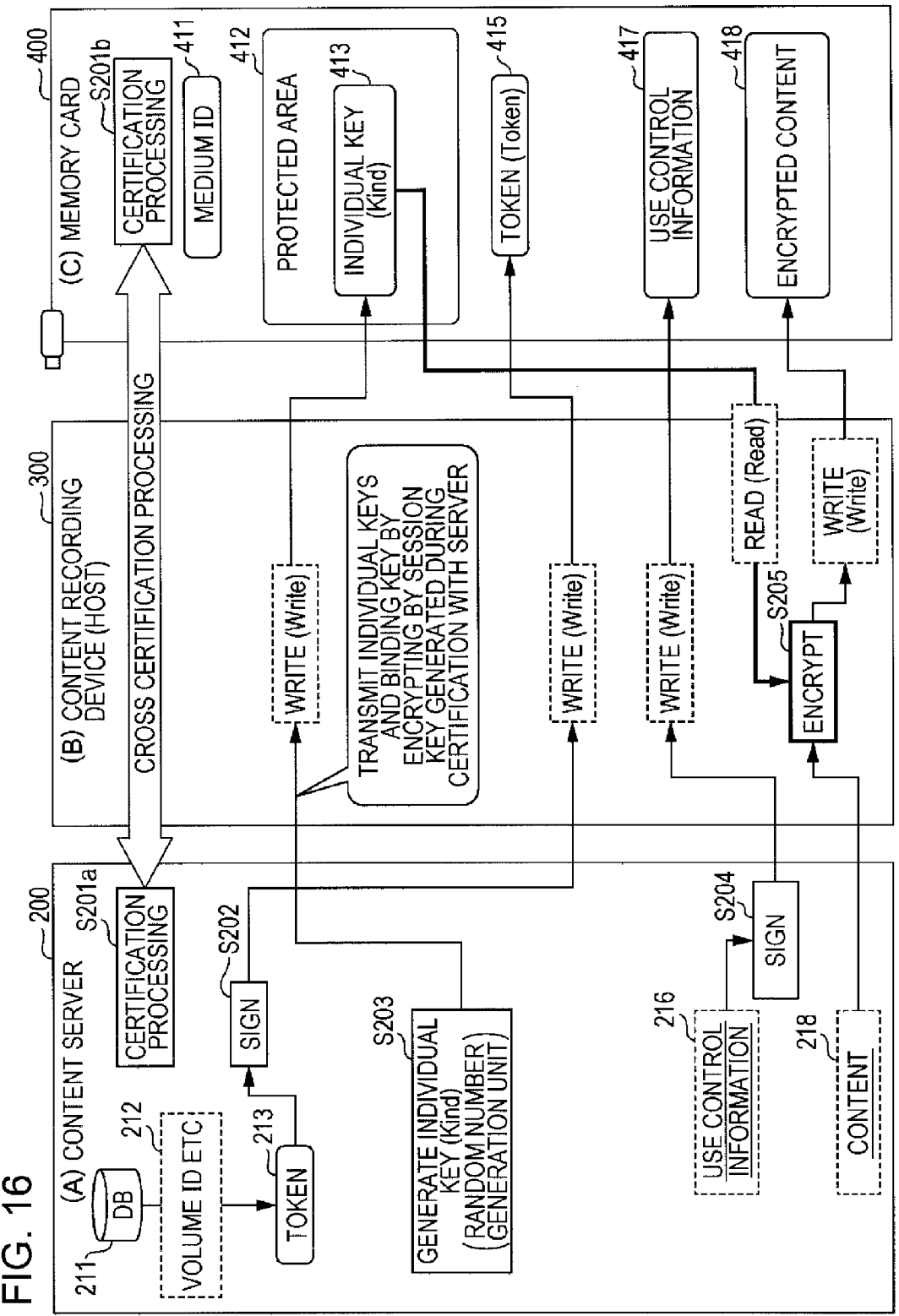
FIG. 16 is a diagram describing a processing example in a case when content that has only been encrypted with individual keys (Kind) is recorded on a recording medium.

(6-1) Processing Example When Title Key is Not Used (FIG. 16)

Figure 17:
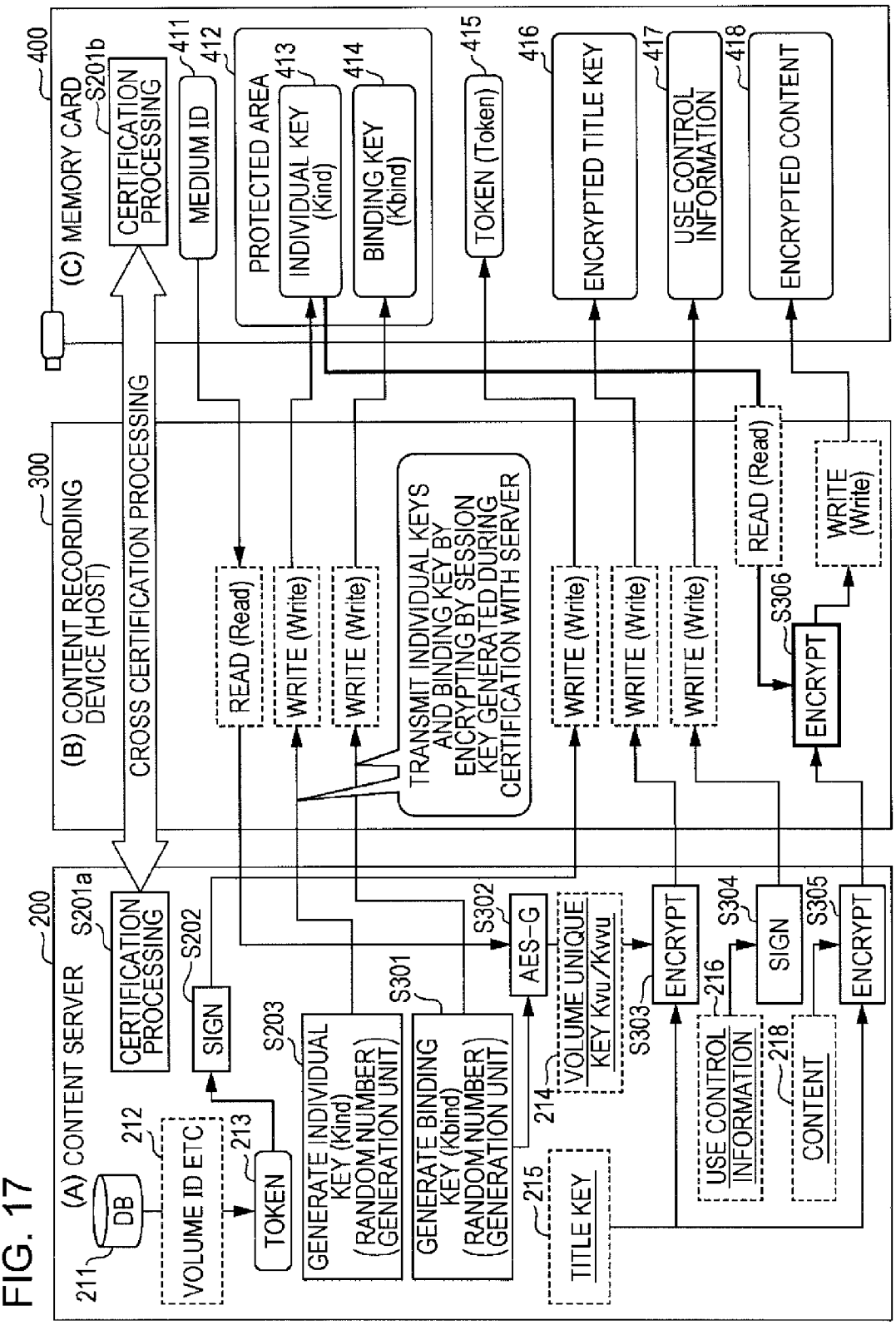
FIG. 17 is a diagram describing a processing example that uses, as well as individual keys (Kind), binding keys (Kbind) that are set as different keys by units of content delivery.

(6-2) Processing Example When Title Key is Used (FIG. 17)

(6-1) Processing Example when Title Key is Not Used

First, a processing sequence where content on which encryption processing using a title key is not executed is provided to a recording device of the user will be described with reference to FIG. 16.

From the left, (A) Content server 200, (E) Content recording device (host) 300, and (C) Memory card 400 are illustrated in FIG. 16.

The (A) content server 200 corresponds to the server 11 illustrated by (a) in FIG. 1, the (B) content recording device corresponds to the recording reproducer 22 or the PC 23 that is the content recording device (host) illustrated by (b) in FIG. 1, and the (C) memory card corresponds to the memory card 31 illustrated by (c) in FIG. 1.

A processing sequence in a case when a content server provides and records content and content management information ether than the content on a memory card is illustrated in FIG. 16.

Here, in a case when content is copied from the disc 12 illustrated in FIG. 1 and recorded on a memory card, while the content is recorded from the disc to the memory card, other management information including the individual keys and the token are transmitted and recorded from the content server to the memory card.

Here, the (C) memory card 400 illustrated in FIG. 16 is equipped on the (B) content recording device (host) 300, executes communication with the (A) content server 200 via a communication unit of the (B) content recording device (host) 300, and receives and records various data received from the (A) content server 200 via the (B) content recording device (host) 300 on the memory card 400.

The processing sequence will be described with reference to FIG. 16.

First, in step S201, cross certification is executed between the content server 200 and the memory card 400. For example, cross certification processing including exchange processing of the public key certificate for each and the like are performed according to a public key encryption system. The content server 200 retains a server certificate in which public keys issued by a certificate authority are stored, and a secret key. The memory card 400 also receives in advance and stores, in the memory unit thereof, the pair of public key certificate and secret key from the certificate authority.

Here, the memory card stores programs that perform cross certification processing and permissibility determination of access to a protected area as described earlier with reference to FIG. 4 and the like, and includes a data processing unit that executes such programs.

If the cross certification between the content server 200 and the memory card 400 is satisfied and the legitimacy of both is verified, the server 200 provides a variety of data to the memory card 400. In a case when the cross certification is not satisfied, the data provision processing from the server 200 is not performed.

Once the cross certification is satisfied, the content server 200 obtains data such as the volume ID that is an identifier corresponding to a specified content collection recorded in a database 211, the content ID as a content identifier, or the like, generates a token 213 on which such IDs and other content management information is recorded, and, in step S202, executes a signature on the token 213 and transmits to one content recording device (host) 300, that is, transmits as writing data to the memory card 400.

Here, the token 213 is data on which content ID as an identifier of the provided content, a hash value for verifying the legitimacy of use control information provided to a client as data in which use regulations for the content are defined, or the like is recorded. The token has the signature of the server set therein, and is set for verification of falsification to be possible.

The client verifies the legitimacy of the token by verifying the signature of the token when the content is reproduced, verifies the legitimacy of a use control information file that is received from a server based on the hash value of the use control information recorded on the token, and performs use (reproduction or copying) of the content according to the use control information recorded on the use control information file, the legitimacy of which has been verified.

The token is transmitted to the (C) memory card 400 from the (A) content server 200 via the (B) content recording device (host) 300, and is recorded on the memory card 400. The recorded data is the token 415 illustrated in the (C) memory card 400 in FIG. 16.

Here, the memory card 400 is demarcated, as described with reference to FIG. 4 and the like, into a protected area in which there is access restriction according to the device, and an unprotected area (user area) with no access restriction.

In addition, the memory card 400 includes a data processing unit for executing programs stored in advance and a certification processing unit that executes certification processing, and the memory card 400 first performs certification processing with a device that executes data writing or reading to and from the memory card 400. At the stage of the certification processing, the memory card 400 receives a device certificate (for example, a server certificate) such as a public key certificate from the partner device, that is, the access requesting device, and using the information recorded on the certificate, determines whether or not access to each of the demarcated areas of a protected area 401 is permitted. The determination processing is performed by units of the demarcated areas (the areas #0, #1, #2 . . . in the drawing) within the protected area 401 illustrated in FIG. 4, and only approved processing in approved areas is permitted.

Restriction information of reading/writing (PAD read/Pad write) from and to a medium is set by, for example, units of the accessing device, for example, a content server, or a recording reproduction device (host). Such information is recorded on a server certificate or a host certificate corresponding to each device.

The memory card 400 verifies the recorded data on the server certificate or the host certificate according to a regulated program stored in advance on the memory card 400, and performs processing to only permit access to areas to which there is access approval.

A protected area 412 is indicated in the (C) memory card 400 illustrated in FIG. 16. Areas other than the protected area 412 are unprotected areas. As illustrated in the drawing, an individual key (Kind) 413 is recorded for the protected area 412. Other data is recorded in the unprotected area (user area).

Here, the individual keys (Kind) 413 are keys that are applied to the encryption and decryption of content, and is generated by random number generation processing or the like on the content server.

As illustrated as the processing of step S203 of the (A) content server 200 of FIG. 16, the individual keys (Kind) are generated on the content server. The keys are generated and provided to a memory card by a server successively executing random number generation or the like every time that processing to provide content from a server or processing to copy content from a disc is executed. Therefore, different individual keys (Kind) are generated for each processing of providing or copying content.

The generated individual keys (Kind) of the server 200 are written into the protected area of the memory card 400.

Here, the processing of writing into the protected area or reading from the protected area of the memory card 400 is restricted. The permissibility of writing or reading is set by units of the access requesting device (server or recording reproduction device (host)) and in units of the demarcated areas (#1, #2 . . . ) set in the protected area.

The memory card records the individual keys (Kind) in the demarcated area within the protected area into which writing is permitted by referencing a certificate received from the access requesting device, for example, a server certificate. That is, the individual keys (Kind) 413 illustrated in FIG. 16. Here, although the inside of the protected area 412 is not illustrated in detail in FIG. 16, the protected area is demarcated into a plurality of demarcated areas (#0, #1, #2 . . . ), and the individual keys (Kind) 413 are recorded in the demarcated areas that are recorded as writing permitted areas on the server certificate.

Here, the transmission of individual keys from the content server 200 to the memory card 400 is performed as the transmission of data that is encrypted by a session key.

The session key is generated when cross certification processing (step S201) is performed between the server 200 and the memory card 400, and is a key that is shared by both. The memory card 400 decrypts the encrypted individual keys by the session key and records in a predetermined demarcated area in the protected area 412 of the memory card 400.

Further, the content server 200 generates use control information 215 that corresponds to the content, executes signature processing by a secret key of the content server 200 in step S204, and provides the use control information 216 to the memory card 400.

The writing result is the use control information 417 illustrated in FIG. 16.

Furthermore, the content server 200 provides content 218 to the content recording device (host) 300.

Here, cross certification is executed between the server 200 and the content recording device (host) 300, and it is preferable that, when the certification processing takes place, content transmission is performed by performing encryption by a session key that is a secret key shared by the server 200 and the content recording device (host) 300.

The content recording device (host) 300 executes encryption, after the received content is encrypted by a session key, by the individual keys (Kind) read from the protected area of the memory card 400.

Here, when the reading processing of the individual keys is performed, cross certification between the content recording device (host) 300 and the memory card 400 is satisfied, and verification of access authority based on the certificate (host certificate) of the content recording device (host) 300 is executed in the memory card 400.

Reading of the individual keys is executed only in a case when access authority is verified, and in step S205, the content recording device (host) 300 executes encryption of the content and processing of writing to the memory card 400 is performed.

The writing result is the encrypted content 418 illustrated in FIG. 16.

(6-2) Processing Example when Title Key is Used (FIG. 17)

Next, a processing sequence in which encrypted content on which encryption processing using a title key has been executed is provided to a recording device of the user will be described with reference to FIG. 17.

From the left, the (A) Content server 200, the (B) Content recording device (host) 300, and the (C) Memory card 400 are illustrated in FIG. 17.

The (A) content server 200 corresponds to the server 11 illustrated by (a) in FIG. 1, the (B) content recording device corresponds to the recording reproducer 22 or the PC 23 that is the content recording device (host) illustrated by (b) in FIG. 1, and the (C) memory card corresponds to the memory card 31 illustrated by (c) in FIG. 1.

A processing sequence in a case when a content server provides and records content and content management information other than the content on a memory card is illustrated in FIG. 17.

Here, in a case when content is copied from the disc 12 illustrated in FIG. 1 and recorded on a memory card, while the content is recorded from the disc on the memory card, other management information Including the individual keys and the token is transmitted and recorded from the content server to the memory card.

Here, the (C) memory card 400 illustrated in FIG. 17 is equipped on the (B) content recording device (host) 300, executes communication with the (A) content server 200 via a communication unit of the (B) content recording device (host) 300, and receives and records various data received from the (A) content server 200 via the (B) content recording device (host) 300 on the memory card 400.

The processing sequence will be described with reference to FIG. 17.

The processing of step S201 to S203 is the same as the processing described earlier with reference to FIG. 16.

In step S201, cross certification is executed between the content server 200 and the memory card 400, and once the cross certification is satisfied, the content server 200 generates the token 213 on which IDs such as the content ID and other content management information is recorded, and, in step S202, executes a signature on the token 213 and transmits to the content recording device (host) 300, that is, transmits as writing data to the memory card 400.

The token is transmitted to the (C) memory card 400 from the (A) content server 200 via the (B) content recording device (host) 300, and is recorded on the memory card 400. The recorded data is the token 415 illustrated in the (C) memory card 400 in FIG. 17.

Next, as the processing of step S203 of the (A) content server 200 of FIG. 16, the individual keys (Kind) are generated on the content server. The keys are generated and provided to a memory card by a server successively executing random number generation or the like every time that processing to provide content from a server or processing to copy content from a disc is executed. Therefore, different individual keys (Kind) are generated for each processing of providing or copying content.

The generated individual keys (Kind) of the server 200 are written into the protected area of the memory card 400.

Here, the processing of writing into the protected area or reading from the protected area of the memory card 400 is restricted. The permissibility of writing or reading is set by units of the access requesting device (server or recording reproduction device (host)) and in units of the demarcated areas (#1, #2 . . . ) set in the protected area.

Step S301 and subsequent processing is different processing from the processing described with reference to FIG. 16.

In step S301, the content server 200 generates a binding key (Kbind) by, for example, random number generation processing. The binding key (Kbind) is a key that is used in the encryption processing of a title key applied to the decryption of encrypted content. The key is generated and provided to a memory card by a server successively executing random number generation or the like every time that processing to provide content to a memory card or processing to copy content from a disc is executed. Therefore, a different binding key is generated for each processing of providing or copying content.

A binding key (Kbind) generated by the server 200 is written into the protected area of the memory card 400. Similarly to the writing processing of the individual keys (Kind), writing processing is performed after access authority is verified by recording verification processing of the server certificate of the memory card. The binding key (Kbind) 414 is recorded in a demarcated area that is recorded as a writing permitted area by the server certificate.

Here, transmission of the binding key from the content server 200 to the memory card 400 is performed as data that is encrypted by a session key.

The session key is generated during the cross certification processing between the server 200 and the memory card 400 (step S201), and is a key that is shared by both. The memory card 400 decrypts the encrypted binding key by the session key and records the binding key in a predetermined demarcated area of the protected area 412 of the memory card 400.

The (A) content server 200 illustrated in FIG. 17 next performs, in step S302, key generation processing (AES-G) using the generated binding key (Kbind) and a medium ID received from the (C) memory card 400. The key generated here is referred to as a volume unique key.

Here, the medium ID is an ID that is recorded in the memory of the memory card 400 in advance as identification information of the memory card 400.

Next, the content server 200 generates, in step S303, an encrypted title key by encrypting the title key (for example, a CPS unit key) 215 that is the encrypted key of the content by a volume unique key.

The content server 200 transmits the generated encrypted title key to the memory card 400 via the content recording device (host) 300. The memory card 400 records the received encrypted title key on the memory card 400. The recorded data is the encrypted title key 416 illustrated in the memory card 400 in FIG. 17. Here, the title key is also referred to as the CPS unit key.

In addition, the content server 200 generates the use control information 216 that corresponds to the content, and in step S304, executes signature processing by a secret key of the content server 200 and provides the use control information 216 to the memory card 400.

Further, in step S305, the content server 200 encrypts the content 218 by a title key 215.

The encrypted content generated here is, for example, the encrypted content illustrated by (c1) in FIG. 3. The encrypted content is encrypted by the different block keys (Kb1 to kbn) that are generated by the block of each unit respectively using the SEED of each unit.

Such data provided from a server is recorded on the memory card 400. Such recorded data is the use control information 417 and the encrypted content 418 illustrated in the memory card 400 in FIG. 17.

7. Hardware Configuration Example of Each Device

Finally, a hardware configuration example of each device that executes the processing described above will be described with reference to FIG. 18.

Figure 18:
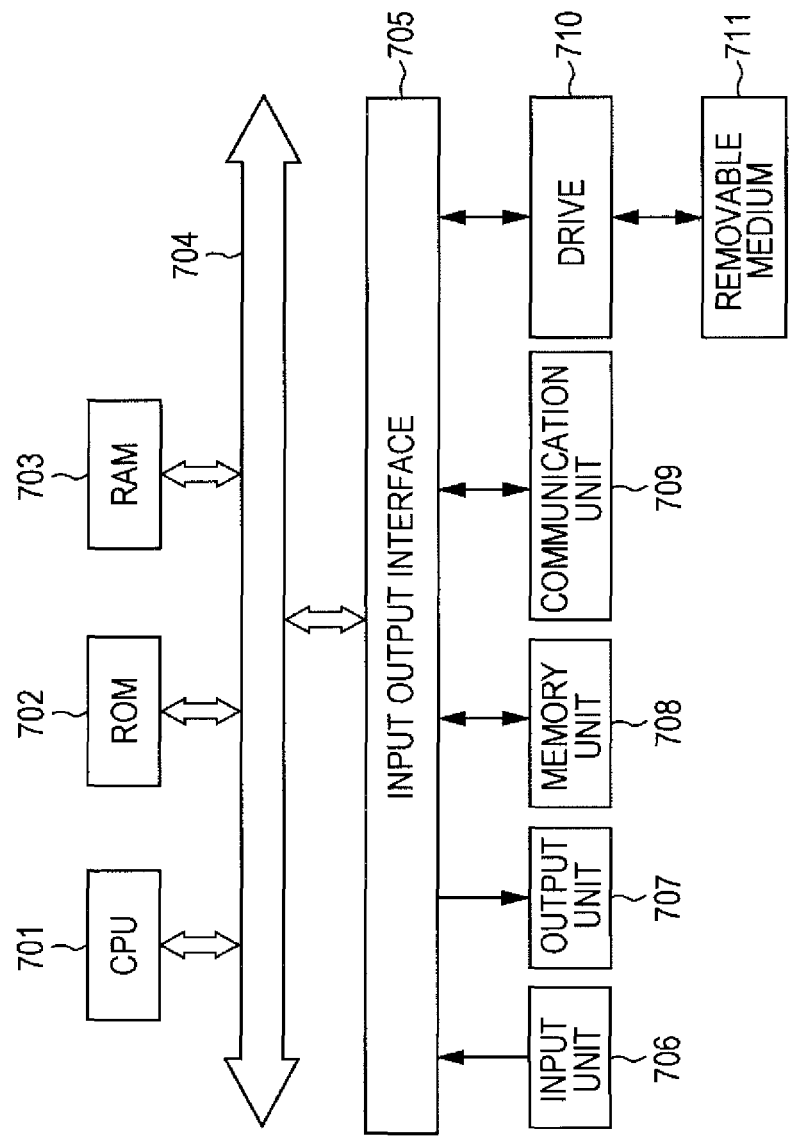
FIG. 18 is a diagram describing a hardware configuration example of an information processing device as a server and a client.

First, hardware configuration examples of a server that executes content provision processing and an information recording device or information reproduction device as a client that equips a memory card and performs recording or reproduction processing of data will be described with reference to FIG. 18.

A CPU (Central Processing Unit) 701 functions as a data processing unit that executes various processes according to a program stored in a ROM (Read Only Memory) 702 or a memory unit 708. For example, the CPU 701 executes communication processing between a server and a client, processing to record received data into a memory card (the removable medium 711 in the drawing), processing to reproduce data from the memory card (the removable medium 711 in the drawing), and the like described in the examples described above. Programs that the CPU 701 executes or data is appropriately recorded in a RAM (Random Access Memory) 703. The CPU 701, the ROM 702, and the RAM 703 are mutually connected by a bus 704.

The CPU 701 is connected to an input output interface 705 via the bus 704, and an input unit 706 composed of various switches, a keyboard, a mouse, a microphone, and the like, and an output unit 707 composed of a display, speakers, and the like are connected to the input output interface 705. The CPU 701 executes various processes corresponding to commands input by the input unit 706, and outputs the processing results to, for example, the output unit 707.

The memory unit 708 connected to the input output interface 70S is composed of, for example, a hard disk, and stores programs that the CPU 701 executes and various data. A communication unit 709 communicates with external devices via a network such as the Internet or a local area network.

A drive 710 that is connected to the input output interface 705 drives the removable medium 711 that is a magnetic disk, an optical disc, a semiconductor memory, or the like, and obtains various data such as the content, key information, and programs that are recorded. For example, data processing according to an obtained program, data processing by the CPU using content or key data, key generation, encryption of content, recording processing, decryption, reproduction processing, or the like is performed.

Figure 19:
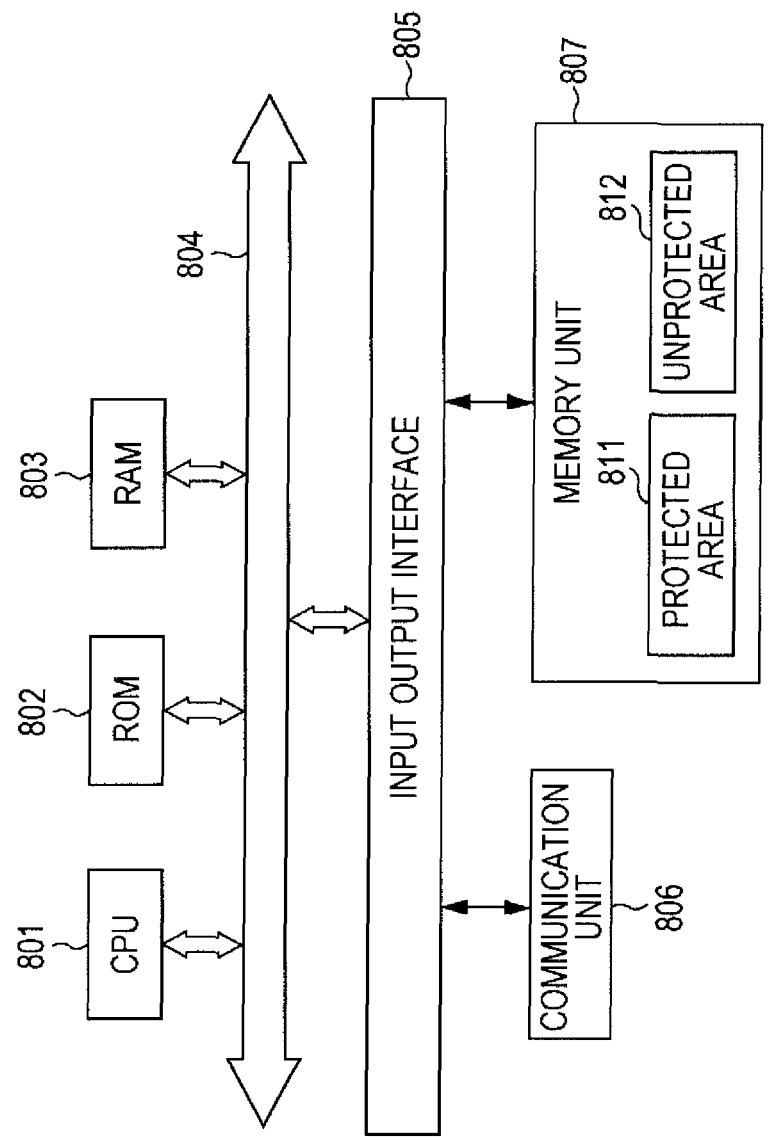
FIG. 19 is a diagram describing a hardware configuration example of a memory card.

FIG. 19 illustrates a hardware configuration example of a memory card.

A CPU 801 functions as a data processing unit that executes various processes according to a program stored in a ROM (Read Only Memory) 802 or a memory unit 807. For example, the CPU 801 executes communication processing with a host apparatus such as a server, a recording device, or a reproduction device, processing such as writing and reading of data to and from the memory unit 807, permissibility determination processing for access to a protected area 811 of the memory unit 807 by units of demarcated areas, and the like described in the examples described above. Programs that the CPU 801 executes or data is appropriately stored in a RAM (Random Access Memory) 803. The CPU 801, the ROM 802, and the RAM 803 are mutually connected by a bus 804.

The CPU 801 is connected to an input output interface 805 via the bus 804, and a communication unit 806 and the memory unit 807 are connected to the input output interface 805.

The communication unit 806 connected to the input output interface 805 executes, for example, communication with a server or host apparatuses. The memory unit 807 is a memory area of data, and as described earlier, includes the protected area 811 to which there is access restriction, and an unprotected area 812 from which data recording is able to be read freely.

Above, the embodiments of the disclosure have been discussed in detail with reference to specific examples. However, it is self-evident that amendments and substitutions are able to be made to the examples by those skilled in the art without departing from the gist of the disclosure. That is, the embodiments of the disclosure have been disclosed in the form of examples, and are not to be interpreted as limiting. The scope of the claims of the patent is to be consulted in order to assess the gist of the disclosure.

In addition, the series of processing described in the specifications is able to be executed by hardware, software, or a combination of both. In a case when processing is performed by software, a program on which the processing sequence is recorded is able to be installed in the memory of a computer included in dedicated hardware and executed, or the program is able to be executed by installing in a general-purpose computer that is able to execute various processes. For example, the program is able to be recorded on a recording medium in advance. Other than installing on a computer from a recording medium, the program is able to be received via a network such as a LAN (Local Area Network) or the Internet and installed an a recording medium such as a built-in hard disk.

Here, the various processes described in the specifications may be executed, without being executed in chronological order according to the description, in parallel or individually according to necessity or the processing capacity of the devices executing the processing. Further, a system according to the present specification is a logically collected configuration of a plurality of devices, and the devices of the respective configurations are not limited to be within the same housing.

It should be understood by those skilled in the art that various modifications, combinations, sub-combinations, and alterations may occur depending on design requirements and other factors insofar as they are within she scope of the appended claims or the equivalents thereof.

The invention claimed is:
1. An information processing device, comprising:
  circuitry configured to:
  record content on a recording medium based on individual keys that are read,
    wherein the individual keys are recorded in a protected area that is an access restricted area set by the recording medium,
  encrypt based on an application of the individual keys, content received from a server or content read from the recording medium,
    wherein the encryption applies the individual keys to selectively encrypt a portion of the content received from the server or the content read from the recording medium, and
  read from the protected area of the individual keys based on presentation of a certificate that has access permission information recorded therein to the recording medium, and the read individual keys,
    wherein the individual keys are stored in a memory unit of the server along with management information that corresponds with the recording medium, and
    wherein the management information comprises at least one of transmission destination information, transmission time information, or transmission date information of the content received from the server.

2. An information processing device, comprising:
circuitry configured to decrypt an encrypted portion of content recorded on a recording medium,
read individual keys recorded in a protected area that is an access restricted area set by the recording medium, and decrypt the encrypted portion of the content that is selectively encrypted based on an application of the individual keys of the content received from a server, and
read from the protected area of the individual keys based on presentation of a certificate that has access permission information recorded therein to the recording medium, and the read individual keys,
wherein the individual keys are stored in a memory unit of the server along with management information that corresponds with the recording medium, and
wherein the management information comprises at least one of transmission destination information, transmission time information, or transmission date information of the content received from the server.

3. A content management system, comprising:
a recording medium;
a recording device configured to record content on the recording medium; and
a server configured to provide an encryption key of the content,
wherein the server is further configured to:
  generate individual keys that are different for each new content recorded on the recording medium,
  record the individual keys on a protected area of the recording medium with restricted access, and
  store the individual keys in a memory unit along with management information that corresponds with the recording medium,
  wherein the management information comprises at least one of transmission destination information, transmission time information, or transmission date information of the content,
wherein the recording device is further configured to:
record the content on the recording medium based on individual keys that are read,
wherein the individual keys are recorded on the protected area, and
encrypt based on an application of the individual keys, content received from the server or content read from the recording medium,
wherein the encryption applies the individual keys to selectively encrypt a portion of the content received from the server or the content read from the recording medium, and
the recording medium is further configured to verify recorded information of a certificate on which access permission information for the recording device is recorded based on an access request to the protected area from the server and the recording device, and permit access based on access authority that is verified.

4. An information processing method, comprising:
in an information processing device:
  recording content on a recording medium,
  wherein the content is recorded on the recording medium based on individual keys that are read,
  wherein the individual keys are recorded on a protected area that is an access restricted area set by the recording medium, and
  encrypting based on application of the individual keys, content received from a server or content read from the recording medium,
  wherein the encryption applies the individual keys to selectively encrypt a portion of the content received from the server or the content read from the recording medium,
  wherein based on the read individual keys, read from the protected area of the individual keys based on presentation of a certificate that has access permission information recorded therein to the recording medium,
  wherein the individual keys are stored in a memory unit of the server along with management information that corresponds with the recording medium, and
  wherein the management information comprises at least one of transmission destination information, transmission time information, or transmission date information of the content received from the server.

5. An information processing method, comprising:
in an information reproduction device:
  decrypting an encrypted portion of content recorded on a recording medium,
  wherein the content is decrypted based on reading of individual keys recorded in a protected area that is an access restricted area set by the recording medium, and
  decrypting the encrypted portion of the content that is selectively encrypted by applying the individual keys of the content received from a server,
  wherein, based on reading of the individual keys, reading from the protected area of the individual keys by presenting a certificate that has access permission information recorded therein to the recording medium,
  wherein the individual keys are stored in a memory unit of the server along with management information that corresponds with the recording medium, and
  wherein the management information comprises at least one of transmission destination information, transmission time information, or transmission date information of the content received from the server.

6. A non-transitory computer-readable medium having stored thereon, computer-executable instructions for causing a computer to execute operations, the operations comprising:
  recording content on a recording medium,
  wherein the content is recorded on the recording medium based on individual keys that are read, and
  wherein the individual keys are recorded in a protected area that is an access restricted area set by the recording medium, and
  encrypting, by applying the individual keys, content received from a server or content read from the recording medium,
  wherein the encryption applies the individual keys to selectively encrypt a portion of the content received from the server or the content read from the recording medium,
  wherein, based on reading of the individual keys, reading from the protected area of the individual keys by presenting a certificate that has access permission information recorded therein to the recording medium,
  wherein the individual keys are stored in a memory unit of the server along with management information that corresponds with the recording medium, and
  wherein the management information comprises at least one of transmission destination information, transmission time information, or transmission date information of the content received from the server.

7. A non-transitory computer-readable medium having stored thereon, computer-executable instructions for causing a computer to execute operations, the operations comprising:
    decrypting an encrypted portion of content recorded on a recording medium,
    wherein the content is decrypted based on reading of individual keys recorded in a protected area that is an access restricted area set by the recording medium, and
    decrypting the encrypted portion of the content that is selectively encrypted by applying the individual keys of the content received from a server,
    wherein, based on reading of the individual keys, reading from the protected area of the individual keys by presenting a certificate that has access permission information recorded therein to the recording medium,
    wherein the individual keys are stored in a memory unit of the server along with management information that corresponds with the recording medium, and
    wherein the management information comprises at least one of transmission destination information, transmission time information, or transmission date information of the content received from the server.

8. The information processing device of claim 1, wherein the encrypted content is recorded in an unprotected area that is a freely accessible area set by the recording medium.

\* \* \* \* \*